US010446023B2

(12) United States Patent
Ren et al.

(10) Patent No.: US 10,446,023 B2
(45) Date of Patent: Oct. 15, 2019

(54) LOGISTICS MONITORING METHOD AND DEVICE

(71) Applicant: ALIBABA GROUP HOLDING LIMITED, Grand Cayman (KY)

(72) Inventors: Jidong Ren, Hangzhou (CN); Simiao Liang, Hangzhou (CN); Yu Wang, Hangzhou (CN); Baohui Pang, Hangzhou (CN); Wanli Min, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 79 days.

(21) Appl. No.: 15/718,733

(22) Filed: Sep. 28, 2017

(65) Prior Publication Data

US 2018/0018868 A1  Jan. 18, 2018

Related U.S. Application Data

(63) Continuation of application No. PCT/CN2016/076697, filed on Mar. 18, 2016.

(30) Foreign Application Priority Data

Apr. 3, 2015 (CN) .......................... 2015 1 0158388

(51) Int. Cl.
*G08G 1/16* (2006.01)
*G01C 21/26* (2006.01)
(Continued)

(52) U.S. Cl.
CPC ............ *G08G 1/0133* (2013.01); *G01W 1/00* (2013.01); *G06Q 10/08* (2013.01);
(Continued)

(58) Field of Classification Search
CPC ...... G08G 1/00; G08G 1/0112; G08G 1/0129; G08G 1/0133; G08G 1/0141; G08G 1/015;
(Continued)

(56) References Cited

U.S. PATENT DOCUMENTS 6,317,686 B1  11/2001  Ran
6,426,709 B1   7/2002  Becker et al.
(Continued)

FOREIGN PATENT DOCUMENTS

CN        1434946 A     8/2003
CN      103065469 A     4/2013
(Continued)

OTHER PUBLICATIONS

International Search Report and Written Opinion for PCT Application No. PCT/CN2016/076697, dated Jun. 1, 2016, 10 pages.
(Continued)

*Primary Examiner* — Yonel Beaulieu

(57) ABSTRACT

A logistics monitoring method and device are disclosed. The method comprises: obtaining an estimated speed of a vehicle at a road section according to the weather and speed data of the road section, and then acquiring logistics monitoring data according to the estimated speed of the vehicle. Weather information can be structured into a pattern that can be applied to logistics monitoring, and precise logistics monitoring and prediction data is acquired by combining weather factors with information about a road section. Due to the large time and space span in long-distance logistics, weather factors have a great impact on long-distance logistics, making the logistics monitoring method and device applicable for monitoring of intercity long-distance logistics.

13 Claims, 13 Drawing Sheets

(51) Int. Cl.
*G01C 21/34* (2006.01)
*G01W 1/00* (2006.01)
*G01S 13/95* (2006.01)
*G08G 1/01* (2006.01)
*G06Q 10/08* (2012.01)
*G08G 1/015* (2006.01)
*G08G 1/052* (2006.01)

(52) U.S. Cl.
CPC ......... *G06Q 10/0838* (2013.01); *G08G 1/015* (2013.01); *G08G 1/0112* (2013.01); *G08G 1/0129* (2013.01); *G08G 1/0141* (2013.01); *G08G 1/052* (2013.01)

(58) Field of Classification Search
CPC .......... G08G 1/052; G08G 1/16; G06Q 10/00; G06Q 10/0838; G01C 21/26; G01C 21/34; B60W 40/00; B60W 40/02; B60W 40/04; B60W 40/06; B60W 40/10; B60W 40/105; G01W 1/00
See application file for complete search history.

(56) References Cited

U.S. PATENT DOCUMENTS

| | | | |
|---|---|---|---|
| 6,587,781 | B2 | 7/2003 | Feldman et al. |
| 6,708,085 | B2 | 3/2004 | Yamane et al. |
| 8,755,991 | B2 | 6/2014 | Wynter et al. |
| 9,659,492 | B2 * | 5/2017 | Modica .................... G08G 1/09 |
| 9,988,056 | B2 * | 6/2018 | Sbianchi .................. A61B 5/18 |
| 2002/0198694 | A1 | 12/2002 | Yang et al. |
| 2003/0033077 | A1 | 2/2003 | Watanabe |
| 2003/0100990 | A1 | 5/2003 | Clapper |
| 2004/0034464 | A1 | 2/2004 | Yoshikawa et al. |
| 2004/0038671 | A1 | 2/2004 | Trayford et al. |
| 2006/0106530 | A1 | 5/2006 | Horvitz et al. |
| 2006/0268736 | A1 | 11/2006 | Lee et al. |
| 2007/0239346 | A1 * | 10/2007 | Hawkins ................ G08G 1/202 701/117 |
| 2008/0094250 | A1 | 4/2008 | Myr |
| 2010/0063715 | A1 | 3/2010 | Wynter et al. |
| 2014/0114556 | A1 | 4/2014 | Pan et al. |
| 2014/0197967 | A1 * | 7/2014 | Modica .................... G08G 1/09 340/932 |
| 2015/0088581 | A1 | 3/2015 | Ikawa |
| 2017/0166217 | A1 * | 6/2017 | Sbianchi .................. A61B 5/18 |

FOREIGN PATENT DOCUMENTS

| | | |
|---|---|---|
| CN | 103794053 A | 5/2014 |
| CN | 104463520 A | 3/2015 |
| EP | 2278573 A1 | 1/2011 |
| WO | 2012/138974 A1 | 10/2012 |

OTHER PUBLICATIONS

First Office Action and Search Report for Chinese Application No. 2015101583882 dated Mar. 11, 2019 with English machine translation (14 pages).

International Preliminary Report on Patentability Chapter I for PCT Application No. PCT/CN2016/076697 dated Oct. 12, 2017 (14 pages).

* cited by examiner

S1: Obtaining an estimated vehicle speed of a vehicle on a road section according to meteorological and vehicle speed data of the road section S2: Acquiring logistics monitoring data according to the estimated vehicle speed

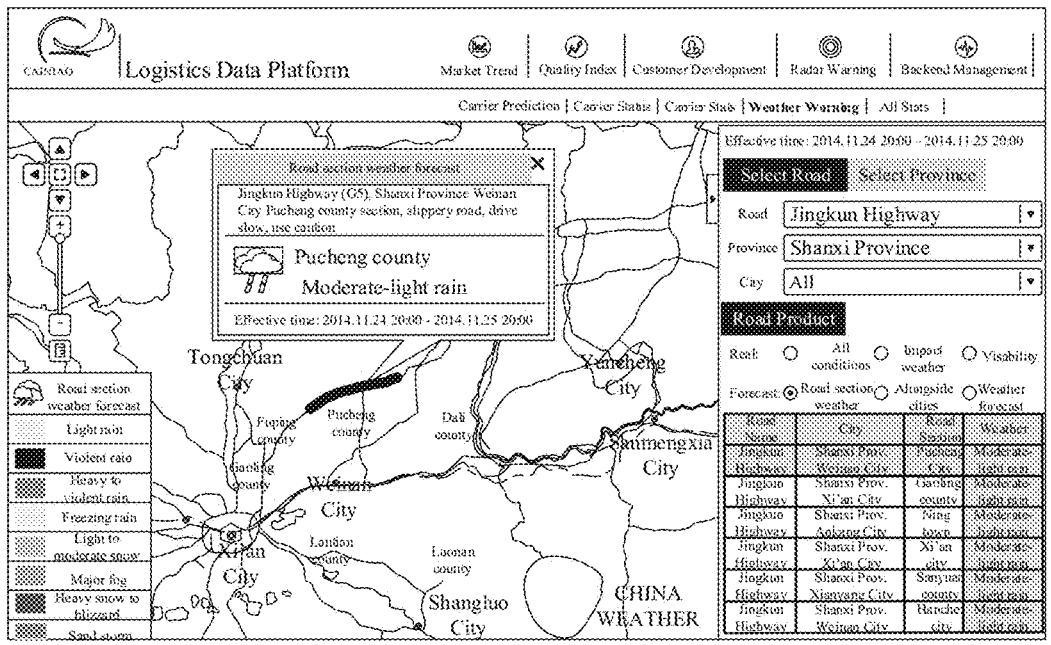

FIGURE 4

S11: Obtaining the average standard vehicle speed corresponding to the vehicle type of the vehicle based on the historical meteorological data of the current road section and time segment, according to the meteorological data of the vehicle on the current road section and the average standard vehicle speed of each vehicle type based on the historical meteorological data according to the current road section and time segment S21: Determining whether the current road section is congested according to a vehicle flow rate of the vehicle on the current road section, the real time vehicle speed, and the corresponding average standard vehicle speed

FIGURE 5

S21: Determining whether the current road section is congested according to the vehicle flow rate of the vehicle on the current road section, the real time vehicle speed, and the corresponding average standard vehicle speed

S22: Acquiring the congestion duration time for the road section according to the vehicle flow rate of the vehicle on the current road section and the estimated vehicle speed of the remaining portion

FIGURE 11

S21: Determining whether the current road section is congested according to the vehicle flow rate of the vehicle on the current road section, the real time vehicle speed, and the corresponding average standard vehicle speed

S22: Acquiring the congestion duration time for the road section according to the vehicle flow rate of the vehicle on the current road section and the estimated vehicle speed of the remaining portion

S23: When the congestion duration time is larger than the preset threshold, adjusting the route of the vehicle through the road section

FIGURE 12

LOGISTICS MONITORING METHOD AND DEVICE

CROSS-REFERENCE TO RELATED APPLICATIONS

The present application is a continuation application of International Patent Application No. PCT/CN2016/076697, filed Mar. 18, 2016, which is based on and claims priority to the Chinese Patent Application No. 201510158388.2, filed Apr. 3, 2015. The entire contents of all of the above-referenced applications are incorporated herein by reference.

TECHNICAL FIELD

This application relates to the telecommunications and computer field, and in particular relates to a logistics monitoring method and device.

BACKGROUND

With the rapid development of e-commerce, logistics service experience has become the focus of competition. Fine-tuned management for the logistics network (monitoring, estimation, optimization) has shown to be extremely important for optimizing logistics business and improving e-commerce services. As shown in FIG. 1, the logistics network is a freight transportation network comprising logistics nodes 11 (e.g., outlets, transfer stations) and the logistics lines 12 that connect these nodes. As shown in FIG. 2, for a logistics network that mainly involves public roads, for the sake of simplification the logistics network, can be displayed with a topological graph, and in FIG. 2 the logistics lines 12 can be divided into several road sections 13 according to certain rules.

The effects of meteorological information on logistics network monitoring are increasingly important, and the price for misunderstanding meteorological information has risen accordingly, and often the effects of the delay of one line could extend to the logistics routes of several provinces. However, in the current monitoring scheme of logistics networks, each logistics company monitors the circumstances of waybill circulation by the current waybill monitoring system, mainly based on the information sent back by each node, and structurally, the meteorological information does not have a substantial coupling relationship with the data of the logistics industry, and usually one road section will pass through several meteorological areas. There is still no good solution on how to carry out structuring of these meteorological areas. The current scheme either requires calling the driver via telephone to understand the situation, or can only obtain the location of each logistics vehicle through the GPS information, and it is not possible to consider comprehensively such factors as the vehicle flow rate, weather, and vehicle speed to conduct segmented monitoring for each line, and in addition it is only possible to reference the information by one's own company, and it is not possible to reference the information by other logistics companies, and therefore causing incomplete and inaccurate information, and difficulties to provide feasible decision support.

The Chinese Patent Application of Publication Number 102256377A, titled "Agricultural Material Monitoring System," focuses on agricultural products, and the Chinese Patent Application of Publication Number 103458236A, tiled "Hazardous Goods Logistics Intelligent Monitoring System," focuses on hazardous chemicals, and special products like agricultural products and hazardous chemicals are extremely sensitive to temperature, humidity, speed, pressure, etc., and therefore real time monitoring is conducted by using sensors. However, the two patent applications can only perform real time monitoring of variables such as the temperature, humidity, speed, pressure, location, etc. to prevent any product deterioration and damage, or deviation from the transportation line. They cannot be combined with the current weather conditions and weather forecast to carry out estimations for the future shipping time of the logistics products to adjust the logistics plan in a timely manner.

In addition, in the Chinese Patent Application of Publication Number 103794053A, titled "Method and System for Fuzzy Prediction of the Urban Short Distance Logistics Single Target Delivery Time," the time required for the delivery vehicle to pass each road section is collected by GPS, after which the delivery time is estimated based on the collected historical data, but the patent application does not consider meteorological factors, and the invention can only be applied to the short distance logistics within a city.

To summarize the above, when confronted with a logistics network whose circumstances of operation are extremely complicated, how to comprehensively consider the effects on every front, such as the waybill volume, road conditions, and weather, is a problem that urgently awaits resolution.

SUMMARY

The purpose of the present disclosure is to provide a logistics monitoring method and system, which can implement more accurate monitoring and estimation for logistics vehicles and waybills.

According to one aspect, the present disclosure provides a logistics monitoring method and device, comprising: obtaining an estimated vehicle speed of a vehicle on a road section according to the meteorological and vehicle speed data of the road section; and acquiring logistics monitoring data according to the estimated vehicle speed. The road section may be a road section that the vehicle is travelling on, and can also be called a current road section.

In some embodiments, the meteorological and vehicle speed data of the road section comprise: real time meteorological data of the road section, a real time vehicle speed of the vehicle and the relationship data between the historical meteorological data and vehicle speed of the road section. The relationship data between the historical meteorological data and vehicle speed of the road section comprises the average standard vehicle speed of each vehicle type obtained based on the historical meteorological data of the road section and time segment.

According to another aspect, the estimated vehicle speed of a vehicle on the road section obtained based on the meteorological and vehicle speed data of the road section comprises: obtaining an average standard vehicle speed corresponding to the vehicle's vehicle type based on the historical meteorological data of the current road section and time segment, according to the meteorological data of the current road section and the average standard vehicle speed of each vehicle type based on the historical meteorological data of the current road section and time segment; and acquiring the logistics monitoring data according to the estimated vehicle speed comprises: determining whether the current road section is congested according to a vehicle flow rate on the current road section, a real time vehicle speed, and a corresponding average standard vehicle speed.

After obtaining the average standard vehicle speed corresponding to the vehicle's vehicle type based on the historical meteorological data of the current road section and time segment, the method may further comprise: determining whether the time for the vehicle to travel on a remaining portion of the current road section with the average of the real time vehicle speed for the current road section's portion that the vehicle has traveled is smaller than a preset threshold, and if it is, taking the average vehicle speed of the real time vehicle speed for the current road section's portion that the vehicle has traveled to be the estimated vehicle speed of the remaining portion of the vehicle on the road section; and if it is not, matching with the average standard vehicle speed that is most similar to the road section from the relationship data of the historical meteorological data and the vehicle speed, and obtaining the estimated vehicle speed of the remaining portion of the vehicle on the road section according to the matched average standard vehicle speed that is most similar to the road section.

The matching with the average standard vehicle speed that is most similar to the road section from the relationship data of the historical meteorological data and the vehicle speed may comprise of the following items: seeking, from the relationship data between the historical meteorological data and vehicle speed, a vehicle speed for the same road section and same time segment with the same weather (e.g., belong to the same type of weather as described below) as the matched average standard vehicle speed that is most similar to the road section; seeking, from the relationship data between the historical meteorological data and vehicle speed, a vehicle speed for the same road section and a similar time segment with the same weather as the matched average standard vehicle speed that is most similar to the road section; and seeking, from the relationship data between the historical meteorological data and vehicle speed, a vehicle speed for a similar road section as the matched average standard vehicle speed that is most similar to the road section.

According to some embodiments, the matching with the average standard vehicle speed that is most similar to the road section from the relationship data of the historical meteorological data and the vehicle speed may comprise: seeking, from the relationship data between the historical meteorological data and vehicle speed, a vehicle speed for the same road section and same time segment with the same weather, and if there is one, using the vehicle speed as the matched average standard vehicle speed that is most similar to the road section; if there is no such a vehicle speed, seeking, from the relationship data between the historical meteorological data and vehicle speed, a vehicle speed for the same road section and a similar time segment with the same weather, and if there is one, using the vehicle speed as the matched average standard vehicle speed that is most similar to the road section; and if there is no such a vehicle speed, seeking, from the relationship data between the historical meteorological data and vehicle speed, a vehicle speed for a similar road section as the matched average standard vehicle speed that is most similar to the road section.

After determining whether the current road section is congested, the method may further comprise: acquiring the congestion duration time for the road section according to the vehicle flow rate on the current road section and the estimated vehicle speed of the remaining portion. After the congestion duration time for the road section is acquired, the method may further comprise: adjusting the route of the vehicle that passes through the road section when the congestion duration time is larger than the preset threshold.

In some embodiments, after using the average vehicle speed of the real time vehicle speed for the portion of the road section that has travelled as the estimated vehicle speed of the remaining portion of the vehicle on the road section, or obtaining the estimated vehicle speed of the remaining portion of the vehicle on the road section according to the matched average standard vehicle speed that is most similar to the road section, the method may further comprise: acquiring an estimated vehicle speed of each subsequent road section of the route of the vehicle according to the estimated vehicle speed for the remaining portion of the road section; and acquiring logistics monitoring data according to the estimated vehicle speeds, comprising: estimating the travel time of the vehicle on each road section according to the remaining portion of the road section and the estimated vehicle speed for each road section; and estimating the time for the vehicle to reach one node according to the travel time of each road section prior to the node.

In some embodiments, before estimating the time for the vehicle to reach one node according to the travel time of each road section prior to the node, the method may further comprise: establishing the correspondence relationship between the vehicle and the waybill. The waybills may comprise the waybills that are already generated and the estimated waybills obtained based on the sales forecast results.

The estimation of the time for the vehicle to reach one node according to the travel time of each road section prior to the node may comprise: estimating the time for the vehicle to reach one node according to the travel time of each road section prior to the current node according to the waybill processing speed of the preceding node and the travel time for each road section prior to the current road section.

After the time for the vehicle to reach one node is estimated according to the travel time of each road section prior to the current node according to the waybill processing speed of the preceding node and the travel times for each road section prior to the current road section, the method may further comprise: estimating a quantity of waybills to be processed for each time segment in the future for the node based on the time for the vehicle to reach the node.

Another aspect according to the present application provides a device for logistics monitoring, comprising: a first apparatus configured to obtain the estimated vehicle speed of a vehicle on a road section according to the meteorological and vehicle speed data of the road section; and a second apparatus configured to acquire logistics monitoring data according to the estimated vehicle speed.

According to some embodiments, the meteorological and vehicle speed data of the road section comprises: real time meteorological data of the road section, real time vehicle speed of the vehicle and the relationship data between the historical meteorological data and vehicle speed of the road section. The relationship data between the historical meteorological data and vehicle speed of the road section may comprise the average standard vehicle speed of each vehicle type based on the historical meteorological data according to the road section and time segment.

The first apparatus may comprise a module configured to obtain the average standard vehicle speed corresponding to the vehicle's vehicle type based on the historical meteorological data of the current road section and time segment, according to the meteorological data of the vehicle on the current road section and the average standard vehicle speed of each vehicle type based on the historical meteorological data of the current road section and time segment; and the second apparatus may comprise a module configured to determine whether the current road section is congested according to the vehicle flow rate on the current road section, the real time vehicle speed, and the corresponding average standard vehicle speed.

In some other embodiments, the first apparatus may further comprise a module configured to determine whether the time for the vehicle to travel on the remaining portion of the current road section with the average vehicle speed of the real time vehicle speed for the current road section's portion that the vehicle has traveled is smaller than a preset threshold, and if it is, take the average vehicle speed of the real time vehicle speed for the current road section's portion that the vehicle has traveled to be the estimated vehicle speed of the remaining portion of the vehicle on the road section; and if it is not, match with the average standard vehicle speed that is most similar to the road section from the relationship data of the historical meteorological data and the vehicle speed, and obtain the estimated vehicle speed of the remaining portion of the vehicle on the road section according to the matched average standard vehicle speed that is most similar to the road section.

To match with the average standard vehicle speed that is most similar to the road section from the relationship data of the historical meteorological data and the vehicle speed, the module may be configured to seek, from the relationship data between the historical meteorological data and vehicle speed, a vehicle speed for the same road section and same time segment with the same weather as the matched average standard vehicle speed that is most similar to the road section; seek, from the relationship data between the historical meteorological data and vehicle speed, a vehicle speed for the same road section and a similar time segment with the same weather as the matched average standard vehicle speed that is most similar to the road section; and seek, from the relationship data between the historical meteorological data and vehicle speed, a vehicle speed for a similar road section as the matched average standard vehicle speed that is most similar to the road section.

According to some other embodiments, to match with the average standard vehicle speed that is most similar to the road section from the relationship data of the historical meteorological data and the vehicle speed, the module may be configured to seek, from the relationship data between the historical meteorological data and vehicle speed, a vehicle speed for the same road section and same time segment with the same weather, and if there is one, using the vehicle speed as the matched average standard vehicle speed that is most similar to the road section; if there is no such a vehicle speed, seek, from the relationship data between the historical meteorological data and vehicle speed, a vehicle speed for the same road section and a similar time segment with the same weather, and if there is one, using the vehicle speed as the matched average standard vehicle speed that is most similar to the road section; and if there is no such a vehicle speed, seek, from the relationship data between the historical meteorological data and vehicle speed, a vehicle speed for a similar road section as the matched average standard vehicle speed that is most similar to the road section.

The second apparatus may further comprise another module configured to acquire the congestion duration time for the road section according to the vehicle flow rate on the current road section and the estimated vehicle speed of the remaining portion. The second apparatus may further comprise a further module configured to adjust the route of the vehicle that passes through the road section when the congestion duration time is larger than the preset threshold.

A further aspect of the present disclosure provides a logistics monitoring method. The method may comprise determining, remotely from a vehicle, a road section that the vehicle is travelling on and a time segment, obtaining historical vehicle speed data on the road section associated with historical meteorological data of the road section and time segment, obtaining current meteorological data, obtaining an estimated vehicle speed of the vehicle on the road section based on the current meteorological data, historical meteorological data, and historical vehicle speed data, determining, remotely from the vehicle, a real time speed of the vehicle, and if the real time speed is less than the estimated vehicle speed, and the difference between the real time speed and the estimated vehicle speed is greater than a threshold, determining the road section is congested.

The meteorological and vehicle speed data of the road section described in the present application may comprise: real time meteorological data of the road section, real time vehicle speed of the vehicle and the relationship data between the historical meteorological data and vehicle speed of the road section, wherein the relationship data between the historical meteorological data and vehicle speed of the road section comprises the average standard vehicle speed of each vehicle type based on the historical meteorological data according to the road section and time segment, and therefore it is possible to realize subsequent obtaining of accurate logistics monitoring data.

The embodiments of the present application determine whether the current road section is congested according to the vehicle flow rate on the current road section, the real time vehicle speed, and the corresponding average standard vehicle speed, and on the one hand they can accurately monitor the state of congestion of the current road section, and on the other hand they can provide an analytical basis for subsequent further logistics monitoring.

The embodiments of the present application take the average vehicle speed of the real time vehicle speed for the current road section's portion that the vehicle has traveled to be the estimated vehicle speed of the remaining portion of the vehicle on the road section, or match with the average standard vehicle speed that is most similar to the road section from the relationship data of the historical meteorological data and the vehicle speed, and obtain the estimated vehicle speed of the remaining portion of the vehicle on the road section according to the matched average standard vehicle speed that is most similar to the road section. Thus, the embodiments can separate different situations and obtain the accurate estimated vehicle speed for the remaining portion of the vehicle on the road section, and thereby provide a monitoring basis for the subsequent accurate acquisition of logistics monitoring data.

When it is determined that the current road section is congested, the congestion duration time for the road section is acquired according to the vehicle flow rate on the current road section and the estimated vehicle speed of the remaining portion, and more accurate information about the state of logistics is acquired; and in addition, when the congestion duration time is larger than the preset threshold, adjustments are carried out for the route of the vehicle through the road section in order to raise the logistics transportation efficiency.

The embodiments of the present application also estimate the travel time of the vehicle on each road section according to the remaining portion of the vehicle on the road sections and the estimated vehicle speeds for each road section, and estimate the time for the vehicle to reach one node according to the travel time of each road section prior to the node, and thereby acquire a more accurate vehicle track estimate.

The embodiments of the present application also establish the correspondence relationship between the vehicle and the waybills, and can monitor the state of circulation of the waybills, and in addition estimate the time for the vehicle to reach the current node according to the travel time of each road section prior to the current node according to the waybill processing speed of the preceding node and the travel times for each road section prior to the current road section, and thereby estimate and obtain the accurate time for a vehicle to reach the current node, and in addition estimate a quantity of waybills to be processed for each time segment in the future for the node based on the time for the vehicle to reach the node, and this makes it possible to increase manpower based on the quantity of waybills and to avoid overcrowding of warehouses in a timely manner.

According to a further aspect, the present disclosure provides a non-transitory computer-readable storage medium storing instructions that, when executed by a processor of a logistics monitoring system, cause the system to perform a method, which comprises obtaining an estimated vehicle speed of a vehicle on a road section according to real time meteorological data of the road section, real time vehicle speed of the vehicle, and relationship data between historical meteorological data and vehicle speed of the road section, and estimating a travel time of the vehicle on the remaining portion of the vehicle on the road section.

DESCRIPTION OF THE DRAWINGS

FIG. 4 shows a schematic diagram of road section meteorological information according to one aspect of the present application;

FIG. 5 shows a flow chart of a logistics monitoring method according to one aspect of the present application;

FIG. 11 shows a flow chart of a logistics monitoring method in still another embodiment of this application;

FIG. 12 shows a flow chart of a logistics monitoring method in another embodiment of this application;

In the figures, the same or similar figure markings stand for the same or similar structural members.

DETAILED DESCRIPTION

In a typical arrangement of an embodiment of the present application, a terminal, a device of a server network and a credible party generally comprise one or more central processing units (CPUs), input/output interfaces, network interfaces, and memory.

The memory may comprise a form such as non-permanent memory, random access memory (RAM), and/or nonvolatile memory in a computer readable medium, such as read-only memory (ROM) or flash memory (flash RAM). The memory is an example of a computer readable medium.

Computer readable media comprise permanent and non-permanent and mobile and non-mobile media that can realize information storage by any method or technique. The information may be computer readable instructions, data structure, a module of a program, or some other data. Examples of storage media of computers include but are not limited to parameter random access memory (PRAM), static random access memory (SRAM), dynamic random access memory (DRAM), other types of random access memory (RAM), read-only memory (ROM), electrically erasable programmable read-only memory (EEPROM), flash memory and other memory technologies, read-only disk read-only memory (CD-ROM), digital multifunction disks (DVD), or other optical storage, magnetic box-type magnetic tapes, magnetic tape or magnetic disk storage, or other magnetic storage devices, or any other non-transmitting media, and all of these can be used to store the information that can be accessed by a computing device. According to the definition in this text, computer readable media do not include transitory computer readable media (transitory media), such as modulated data signals and carrier waves.

Figure 1:
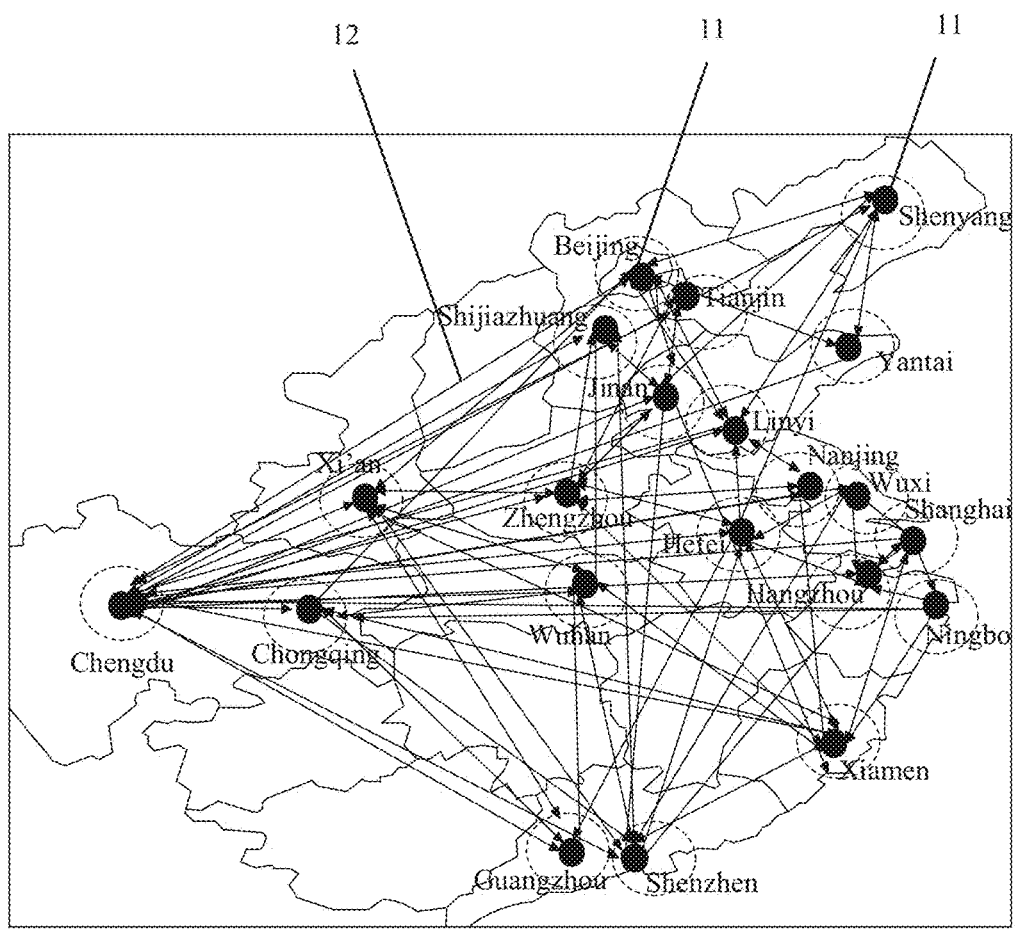
FIG. 1 shows a schematic diagram of a current logistics network.
Figures 2, 3:
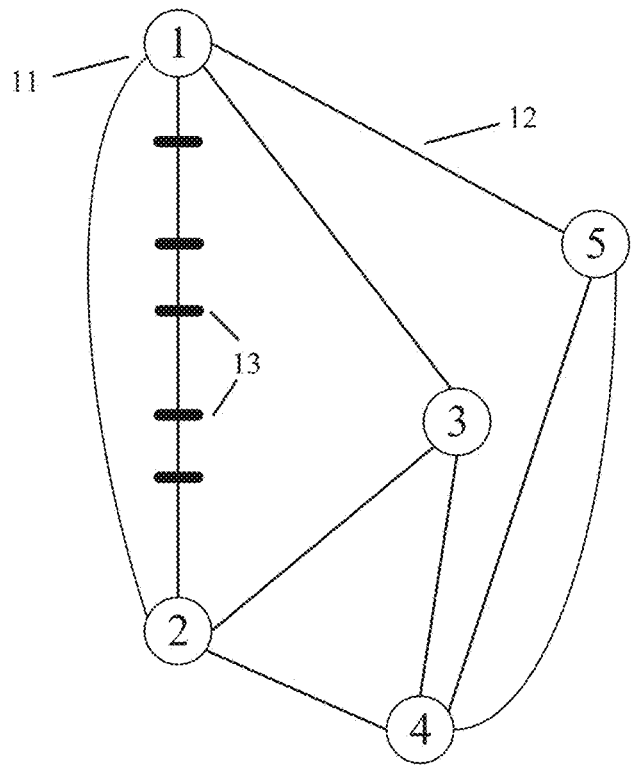
FIG. 2 shows a topological graph of the current logistics network.
FIG. 3 shows a flow chart of a logistics monitoring method according to one aspect of the present application.

As shown in FIG. 3, the present application provides a logistics monitoring method, comprising:

Step S1, obtaining an estimated vehicle speed of a vehicle on a road section according to meteorological and vehicle speed data of the road section. The road section may be a road section that the vehicle is currently travelling on. The vehicle may be equipped with GPS and/or other location tracker. The GPS and/or location tracker may send signal including location information of the vehicle to a receiver via, e.g., cellular network, which ultimately transmit the signal to a computer system that performs the logistics monitoring method. Thus, the computer system remotely monitors the vehicle and obtains information on, e.g., which road section the vehicle is travelling on, a real time speed of the vehicle. The computer system may also include route information of the vehicle, for example, the starting point and the destination of the vehicle, and map information. The meteorological data may comprise real time meteorological data and historical meteorological data. The real time meteorological data comprises the current weather condition data and the current weather forecast data of each road section, and the meteorological data can be acquired through various meteorological channels, such as through a national meteorological bureau or other meteorological platforms. For example, as shown in FIG. 4, it is possible to subdivide the highways and national roads of the entire country into road sections at county district level, and to provide real time meteorological data and historical meteorological data of each road section.

Step S2, acquiring logistics monitoring data according to the estimated vehicle speed. In one embodiment, the meteorological information is structured in a form usable in logistics monitoring. The computer system combines meteorological factors and road section information to acquire accurate logistics monitoring and estimation data. Since the time and space spans of long distance logistics are large, the effects of the meteorological factors on long distance logistics are relatively significant, and technical solutions in this application are applicable to long distance logistics between cities. In particular, the computer system is programed or configured to obtain meteorological information, e.g., from online whether forecast website, and obtain vehicle's location and/or speed information, e.g., from vehicle's GPS, and based on the meteorological information and location/speed information, provide accurate estimation of vehicle's travel status, e.g., time to destination, road congestions, etc.

In one embodiment of the logistics monitoring method of the present application, the meteorological and vehicle speed data of the road section comprise: the real time meteorological data of the road section, real time vehicle speed of the vehicle and the relationship data between the historical meteorological data and vehicle speed of the road section, thereby realizing the subsequent obtaining of accurate logistics monitoring data. Here, the real time vehicle speed of a vehicle can be obtained based on GPS information of the vehicle, and the GPS information can determine the road section where the vehicle is travelling. GPS refers to the global satellite positioning system. The system measures the distance between a satellite with a known location and the user receiver. The GPS system integrates the data of several satellites to calculate the position of the receiver, which is the vehicle. At present the majority of the transport vehicles of major logistics companies have GPS receivers installed in them, and they are used to navigate and monitor vehicles with the freight.

In one embodiment of the logistics monitoring method of the present application, the relationship data between the meteorological and vehicle speed data of the road section comprises the average standard vehicle speed of each vehicle type based on the historical meteorological data according to the road section and time segment, thereby realizing the subsequent obtaining of accurate logistics monitoring data. Here, the historical meteorological data can be categorized into 9 basic types: Normal (cloudy day, sunny day), light to moderate rain, heavy to violent rain, thunderstorm, freezing rain, major fog, small to moderate snow, heavy snow to blizzard, sand storm; the vehicle types can be classified based on the classification of freight loaded automobiles in the national standard for automobile classification (GB9417-89). For example, they are as shown in Table 1:

TABLE 1

| Vehicle type | Factory quantitative gross mass (GA) |
|---|---|
| Miniature | GA ≤ 1.8 tons |
| Small | 1.8 tons < GA ≤ 6 tons |
| Medium | 6 tons < GA ≤ 14 tons |
| Large | GA > 14 tons |

The average standard vehicle speed of each vehicle type based on the historical meteorological data according to the road section and time segment can be expressed as shown in Table 2:

TABLE 2

| Road section ID | Vehicle type | Road section | Historical meteorological data | Average standard vehicle speed (km/h) |
|---|---|---|---|---|
| 01 | Small | 2014 May 7 12:00-13:00 | Normal | 85 |
| 01 | Small | 2014 May 7 13:00-14:00 | Small to medium rain | 60 |
| ... | | | | |
| 02 | Medium | 2014 May 7 00:00-01:00 | Normal | 75 |
| 02 | Medium | 2014 May 7 01:00-02:00 | Thunderstorm | 30 |

For example, the method for calculating the average standard vehicle speed based on the historical meteorological data for a certain time segment, certain road section, and certain vehicle type can be as shown below.

The average standard vehicle speed based on the historical meteorological data for a certain time segment, certain road section, and certain vehicle type=(the sum of the travel distance for vehicles of the vehicle type in the time segment on the road section based on the historical meteorological data)/(the sum of the travel time for vehicles of the vehicle type in the time segment on the road section based on the historical meteorological data).

For example, statistics are compiled for the average vehicle speed for a certain road section for 12:00-13:00, wherein:

small vehicle 1 travelled on the road section from 12:23-13:00 under normal weather, the travel time was 0.52 hours, and the travel speed was 40 km;

small vehicle 2 travelled on the road section from 12:02-12:50 under normal weather, the travel time was 0.6 hours, and the travel speed was 60 km (to travel the entire road section);

. . .

Thus, the average standard vehicle speed based on the historical meteorological data for the certain time segment, certain road section and certain vehicle type=(40+ 60+ . . . )/(0.52+0.6+ . . . ). A person skilled in the art of this field should be able to understand that the above-described relationship between the historical meteorological data and vehicle speed of the road section is only an example, and if other current or future descriptions of the relationship data between the historical meteorological data and vehicle speed of the road section are applicable to this application, they shall also fall within the protection scope of this application, and are incorporated herein by reference.

As shown in FIG. 5, in one embodiment of the logistics monitoring method of the present application, Step S1, obtaining the estimated vehicle speed of a vehicle on a road section according to the meteorological and vehicle speed data of the road section, comprises:

Step S11, obtaining an average standard vehicle speed corresponding to the vehicle type of the vehicle on the current road section where the vehicle is travelling and in a current time segment under historical meteorological data. The obtaining can be based on the average standard vehicle speed of each vehicle type on the road section and in the time segment under historical meteorological data, plus the current meteorological data of the road section. That is, obtaining the first estimated vehicle speed for the road section.

Correspondingly, Step S2, acquiring the logistics monitoring data according to the estimated vehicle speed comprises:

Step S21, determining whether the current road section is congested according to a vehicle flow rate on the current road section, the real time vehicle speed, and the corresponding average standard vehicle speed, and thereby on the one hand it is possible to accurately monitor the state of congestion of the current road section, and on the other hand it is possible to provide an analytical basis for subsequent further logistics monitoring. In one embodiment, the vehicle flow rate can be measured by a number of vehicles passing a given point in a certain time frame. The vehicle flow rate can be measured by sensors or based on GPS information. Here, it is possible to comprehensively consider the factors of the vehicle flow rate of the current road section, and compare if the real time vehicle speed is smaller than the corresponding average standard speed for at least one preset threshold, and then determine that the current road section is congested. A person skilled in the art of this field should be able to understand that the description of the above-described determination of whether the road section is congested is only an example, and if other current or future descriptions of the determination of whether the road section is congested are applicable to this application, they shall also fall within the protection scope of this application, and moreover are covered by this application.

Figure 6:
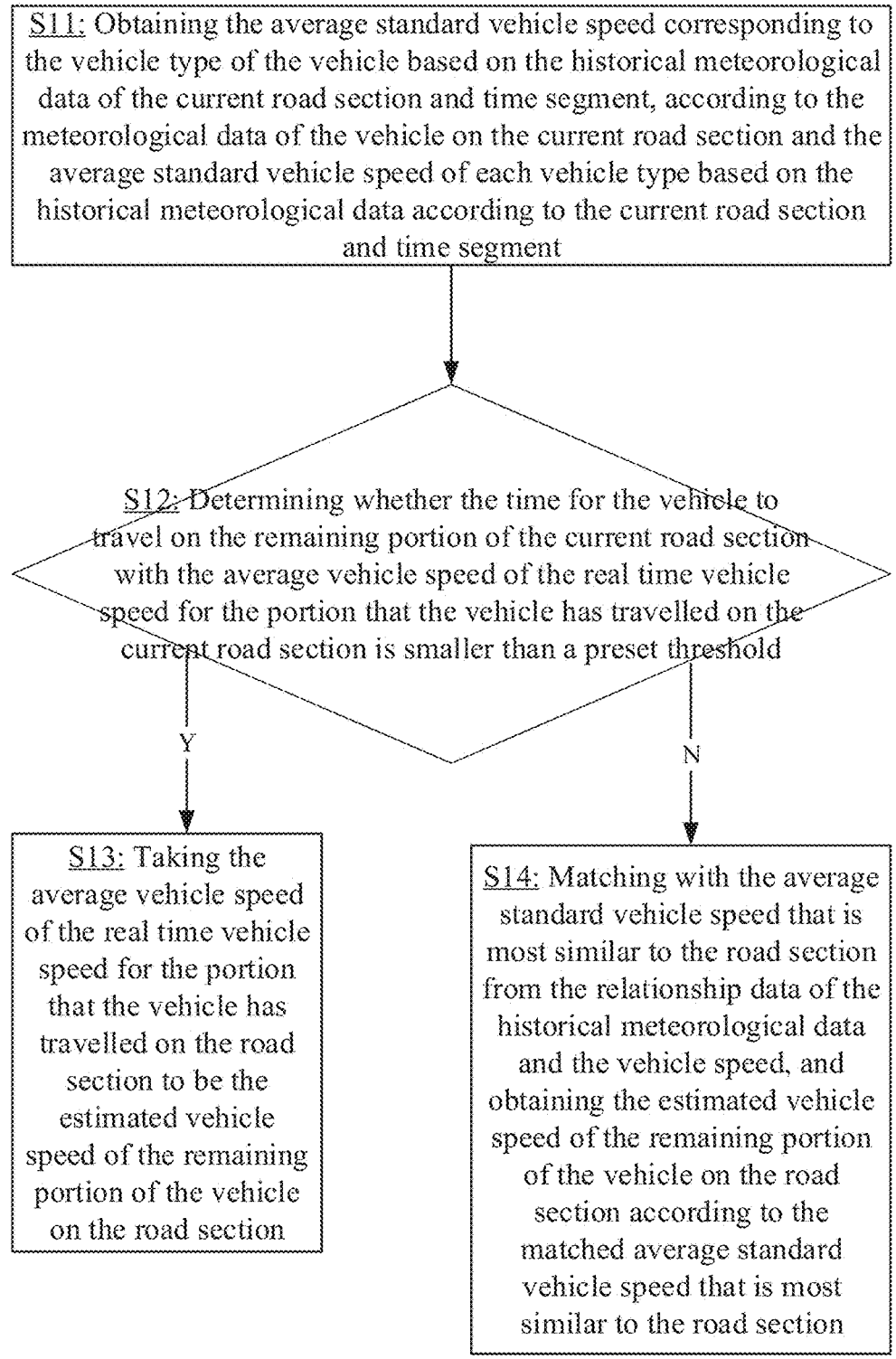
FIG. 6 shows a flow chart of a logistics monitoring method according to another aspect of the present application.

As shown in FIG. 6, in one embodiment of the logistics monitoring method of the present application, Step S11, obtaining the average standard vehicle speed corresponding to the vehicle type of the vehicle based on the historical meteorological data of the current road section and time segment, according to the current meteorological data on the current road section and the average standard vehicle speed of each vehicle type based on the historical meteorological data according to the current road section and time segment, may further comprise:

Step S12, determining whether the time for the vehicle to travel on the remaining portion of the current road section with an average of the real time vehicle speed for the portion that the vehicle has traveled on the current road section is smaller than a preset threshold, and if it is smaller than the preset threshold, proceeding to step S13, and if it is not smaller than the preset threshold, proceeding to step S14;

Step S13, taking the average of the real time vehicle speed for the portion that the vehicle has traveled on the road section to be the estimated vehicle speed of the remaining portion of the vehicle on the road section, thereby obtaining a second estimated vehicle speed of the road section;

Step S14, from the relationship data of the historical meteorological data and the vehicle speed, identifying an average standard vehicle speed under a condition that is most similar to the condition of the current road section, and obtaining the estimated vehicle speed of the remaining portion of the vehicle on the road section according to the identified average standard vehicle speed, thereby obtaining the second estimated vehicle speed of the road section.

Figure 7:
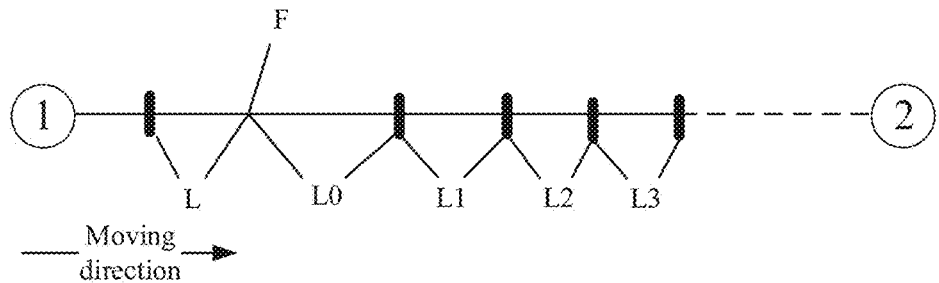
FIG. 7 shows a schematic diagram of road sections a vehicle travels between node 1 and node 2 in one embodiment of the present application.

Here, the preset threshold can be set at a relatively short time such as 1 hour, and if the time for the vehicle to travel over the remaining portion of the current road section at the average vehicle speed of the real time vehicle speed of the portion of the current road section that it has travelled over is smaller than the preset threshold, then the likelihood of weather changes is not large within the short time of the preset threshold, and if the estimated vehicle speed at which the vehicle can travel over the remaining portion of the current road section at the average vehicle speed of the real time vehicle speed of the portion of the current road section that it has travelled over is conversely larger than or equal to the preset threshold, then the likelihood of weather changes is relatively large within the relatively long time that is larger than the preset threshold, and identifying is done with the average standard vehicle speed under a condition that is most similar to the condition of the current road section from the relationship data of the historical meteorological data and the vehicle speed, and the estimated vehicle speed of the remaining portion of the vehicle on the road section is obtained according to the identified average standard vehicle speed that is most similar to the road section, and the vehicle travels over the remaining part of the current road section at this estimated speed. The accurate estimated vehicle speed of the vehicle on the remaining portion of the road section obtained for these two situations here can provide a data basis for subsequent accurate acquiring of logistics monitoring data. For example, as in FIG. 7, assuming that a certain vehicle (assuming medium sized vehicle) drives on i road sections between node 1 and node 2, and assuming that the vehicle's current location is F:

$T_0$=Current time at the vehicle's current location (if it is an integral point of time);

L=Length of the portion that the vehicle has travelled on the current road section;

$L_0$=Length of the remaining portion of the current road section;

$L_i$=Length of the subsequent number i road sections, i=1, 2, 3, . . . ;

Amount of time required to reach node 2

$t=t_0+t_1+t_2+\ldots$

Here $t_i$ is the driving time for road section $L_i$, i=0, 1, 2, 3, . . . ;

In order to calculate $t_0$, assume $v_0$=The average of the real time speed of the portion L already travelled by the vehicle There can be two situations:

If $L_0/v_0<=1$ hour, then $t_0=L_0/v_0$.

Otherwise, after 1 hour, assume that the weather forecast for the $L_1$ road section at 14:00-15:00 is as shown in Table 3:

TABLE 3

| Time segment | Weather | Temperature (° C.) | Wind force (grade) | Precipitation (mm) |
|---|---|---|---|---|
| 2014 May 8 14:00-15:00 | Small to moderate rain | 16 | 5 | 6 |

Thus, the average standard vehicle speed that is most similar to the condition of the road section can be identified/matched from the relationship data of the historical meteorological data and the vehicle speed, and the estimated vehicle speed $v_0'$ of the remaining portion of the vehicle on the road section can be obtained according to the identified/matched average standard vehicle speed. A person skilled in the art of this field should be able to understand that the description of the above-described estimated vehicle speed of the remaining portion of the vehicle on the road section is only an example, and if other current or future descriptions of the estimated vehicle speed of the remaining portion of the vehicle on the road section are applicable to this application, they shall also fall within the protected scope of this application, and are incorporated herein by reference.

In a further embodiment of the logistics monitoring method of the present application, in Step S14, the matching with the average standard vehicle speed that is most similar to the road section (i.e., the average standard vehicle speed under a condition that is more similar to the current condition of the road section) from the relationship data of the historical meteorological data and the vehicle speed comprises one of the following steps: Step S141, Step S142 and Step S143.

Step S141, seeking, from the relationship data between the historical meteorological data and vehicle speed, the vehicle speed for the same road section and same time segment with the same weather (e.g., belong to the same type of the 9 basic types as discussed above) as the matched average standard vehicle speed that is most similar to the road section;

Step S142, seeking, from the relationship data between the historical meteorological data and vehicle speed, the vehicle speed for the same road section and a similar time segment with the same weather as the matched average standard vehicle speed that is most similar to the road section; and Step S143, seeking, from the relationship data between the historical meteorological data and vehicle speed, the vehicle speed for a similar road section as the matched average standard vehicle speed that is most similar to the road section. By any of the Step S141, Step S142, and Step S143, it is possible to obtain a relatively accurate average standard vehicle speed that is most similar to the road section. A person skilled in the art of this field should be able to understand that the description of the above-described matching with the average standard vehicle speed that is most similar to the road section is only an example, and if other current or future descriptions of the matching with the average standard vehicle speed that is most similar to the road section are applicable to this application, they shall also fall within the protection scope of this application, and are incorporated herein by reference.

Figure 8:
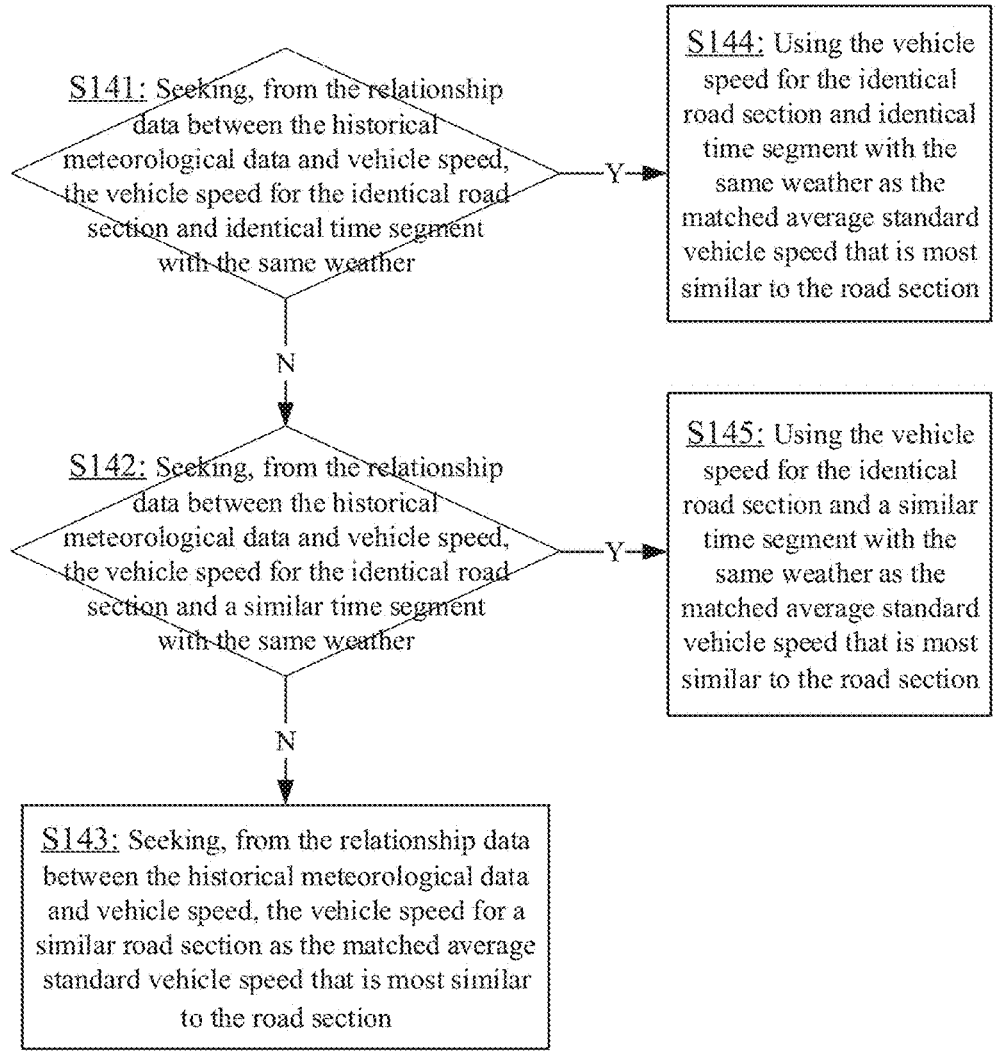
FIG. 8 shows a flow chart of a logistics monitoring method in yet another embodiment of the present application.

As shown in FIG. 8, in a further embodiment of the logistics monitoring method of the present application, in Step S14, the matching with the average standard vehicle speed that is most similar to the road section from the relationship data of the historical meteorological data and the vehicle speed comprises:

Step S141, seeking, from the relationship data between the historical meteorological data and vehicle speed, the vehicle speed for the same road section and same time segment with the same weather, and if there is such vehicle speed, proceeding to Step S144, and using the vehicle speed as the matched average standard vehicle speed that is most similar to the road section, and if there is no such vehicle speed, proceeding to Step S142;

Step S142, seeking, from the relationship data between the historical meteorological data and vehicle speed, the vehicle speed for the same road section and a similar time segment with the same weather, and if there is such vehicle speed, proceeding to Step S145, and using the vehicle speed as the matched average standard vehicle speed that is most similar to the road section, and if there is no such vehicle speed, proceeding to Step S143;

Step S143, seeking, from the relationship data between the historical meteorological data and vehicle speed, the vehicle speed for a similar road section as the matched average standard vehicle speed that is most similar to the road section. Here, the accuracy of the average standard vehicle speed that is most similar to the road section as obtained in Step S141, Step S142, and Step S143 declines successively, so if a preceding step is applicable, the preceding step will preferably be applied, and the following step(s) may not be applied, and a relatively accurate average standard vehicle speed that is most similar to the road section can be obtained. A person skilled in the art of this field should be able to understand that the description of the above-described matching with the average standard vehicle speed that is most similar to the road section is only an example, and if other current or future descriptions of the matching with the average standard vehicle speed that is most similar to the road section are applicable to this application, they shall also fall within the protection scope of this application.

For example, estimating the vehicle speed $v_0'$ of the remaining portion of the road section can be realized by the following process:

Step I: seeking, from the relationship data between the historical meteorological data and vehicle speed, the vehicle speed for the same road section and same time segment with the same weather as the matched average standard vehicle speed that is most similar to the road section. For example, when seeking, from the relationship data between the historical meteorological data and vehicle speed, the most recent similar weather conditions for the same road section in the same time segment (14:00-15:00), the average travel speed of a vehicle of the same type is $v'$, that is, the matched average standard vehicle speed that is most similar to the road section. The speed coefficient of the vehicle $r$ is calculated, and $r$=the average of the real time vehicle speed for the portion over which the vehicle has travelled L/the average for the portion over which vehicles of the same type have already travelled L, wherein the average of the real time vehicle speed for the portion over which the vehicle has travelled L can be obtained according to GPS data, and the average for the portion over which vehicles of the same type have already travelled L can be obtained by matching from the relationship data between the historical meteorological data and vehicle speed. Here, the calculation of the speed coefficient $r$ is added, and it is possible to make the estimated speed for the remaining portion of the vehicle on the road section more accurate. Then, according to the matched average standard vehicle speed that is most similar to the road section, it is possible to obtain the estimated speed for the remaining portion of the vehicle on the road section $v_0'=rv'$; in addition, if similar weather conditions have not appeared in the same time segment, Step II is implemented;

Step II: seeking, from the relationship data between the historical meteorological data and vehicle speed, the vehicle speed for the same road section and a similar time segment with the same weather as the matched average standard vehicle speed that is most similar to the road section. In other words, when the most recent similar weather conditions appeared for the same road section in a similar time segment, the average travel speed of a vehicle of the same type is v', that is, the matched average standard vehicle speed that is most similar to the road section. Then the estimated vehicle speed for the remaining portion of the vehicle on the road section $v_0'=r\rho v'$ is obtained according to the matched average standard vehicle speed that is most similar to the road section. Here, $\rho$ is the average vehicle speed in normal weather for the same time segment and same road section or the average vehicle speed in normal weather for a similar time segment and the road section. Here, the definition of similar time segment can be: taking the data for the latest period of time, for example one week, comparing the difference between the average vehicle speeds for two time segments (after normalization) under normal weather; and when the difference is <0.1, it is a similar time segment.

Figure 9:
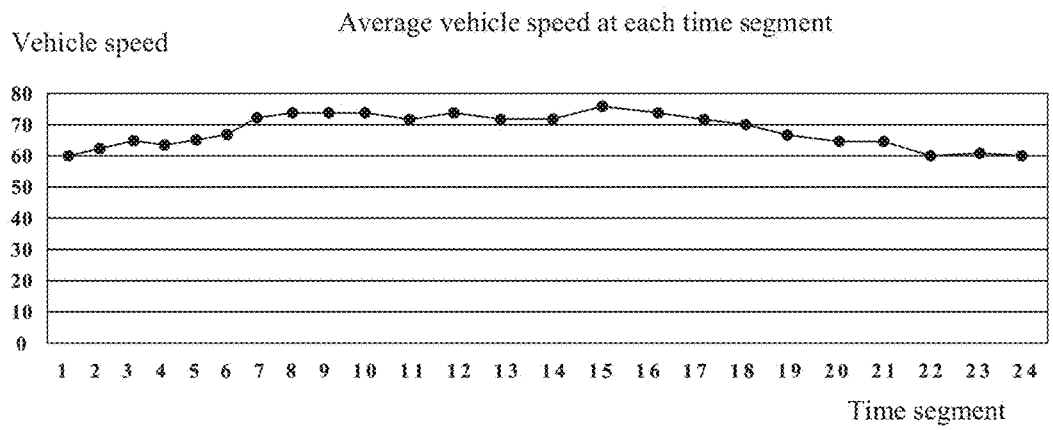
FIG. 9 shows a schematic diagram of an average vehicle speed of each time segment in one embodiment of the present application.
Figure 10:
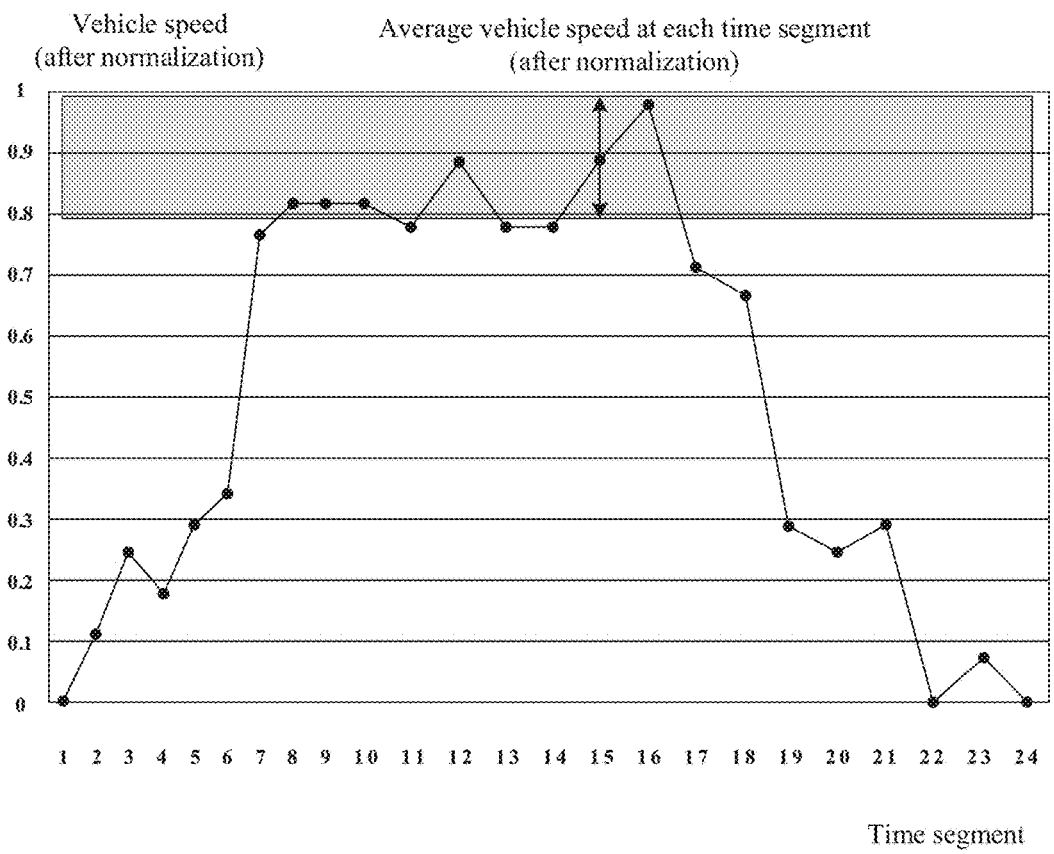
FIG. 10 shows a schematic diagram of an average vehicle speed after normalization of each time segment in one embodiment of the present application.

For example, 24 time segments (time segment 1 (0:00-1:00), time segment 2 (1:00-2:00), . . . , time segment 24 (23:00-24:00)) and the average vehicle speed for the most recent one week under normal weather are shown in FIG. 9, based on which normalization can be conducted for the vehicle speed, that is the vehicle speed after normalization=(vehicle speed−minimum vehicle speed)/(maximum vehicle speed−minimum vehicle speed), and the vehicle speed after normalization shown in FIG. 10 is obtained. In FIG. 10, time segments 8, 9, 10, 12, and 16 are similar to time segment 15 (14:00-15:00). If the same weather conditions have not appeared in any of these time segments, then Step III is implemented. If the same weather conditions have recently appeared in one of these time segments, for example time segment 8, then the estimated vehicle speed for the remaining portion of the vehicle on the road section $v_0'=r*$the vehicle speed when similar weather conditions appeared in time segment 8*(the average vehicle speed for normal weather in time segment 15/the average vehicle speed for normal weather in time segment 8).

Step III: seeking, from the relationship data between the historical meteorological data and vehicle speed, the vehicle speed for a similar road section as the matched average standard vehicle speed that is most similar to the road section. The method for calculating road section similarity can be taking the same time segment such as one week for the latest period of time and the data for same vehicle types for similar time segments, comparing the current road section and every other road section under various weather conditions. The similarity coefficient for the two road sections can be defined as=absolute value of the speed difference of the two road sections/sum of the speeds of the two road sections. Then the mean is acquired according to different weather conditions, for example as shown in Table 4:

TABLE 4

| Weather | Road section 01 | Road section 02 |
|---|---|---|
| Normal | 75 | 65 |
| Small to moderate rain | 64 | 57 |
| . . . | | |

Thus, similarity coefficient for the two road sections=(|75−65|/(75+65)+|64−57|/(64+57) . . . )/number of weather types. Finally the corresponding road section with the minimum similarity coefficient of the two road sections is acquired, and this is the matched similar road section, and subsequently it is possible to obtain the estimated vehicle speed of the vehicle on the remaining portion of the road section according to the matched similar road section.

As shown in FIG. 11, in a further embodiment of the logistics monitoring method of the present application, Step S21 further comprises, after the determination of whether the current road section is congested:

Step S22, when it is determined that the current road section is congested, the congestion duration time for the road section is acquired according to the vehicle flow rate on the current road section and the estimated vehicle speed of the remaining portion, and more accurate information about the state of logistics is acquired. Here, when the congestion time of the road section is acquired, in addition to taking into consideration factors such as the vehicle flow rate on the current road section and the estimated vehicle speed for the remaining portion, it is also possible to consider the vehicle flow rate and the estimated vehicle speed for the neighboring road sections to the front and the rear of the current road section, and to obtain a more accurate congestion duration time for the current road section thereby. A person skilled in the art of this field should be able to understand that the description of the above-described acquisition of the congestion duration time for the road section is only an example, and if other current or future descriptions of the acquisition of the congestion duration time for the road section that is most similar to the road section are applicable to this application, they shall also fall within the protection scope of this application.

As shown in FIG. 12, in a further embodiment of the logistics monitoring method of the present application, Step S22 further comprises, after the congestion duration time is acquired:

Step S23, when the congestion duration time is larger than the preset threshold, the route of the vehicle passing through the road section are adjusted. Here, when a long-term delay might occur in a certain road section, it is possible to carry out re-planning and adjustment to the route of the vehicle on the road section in order to raise the logistics transportation efficiency.

Figure 13:
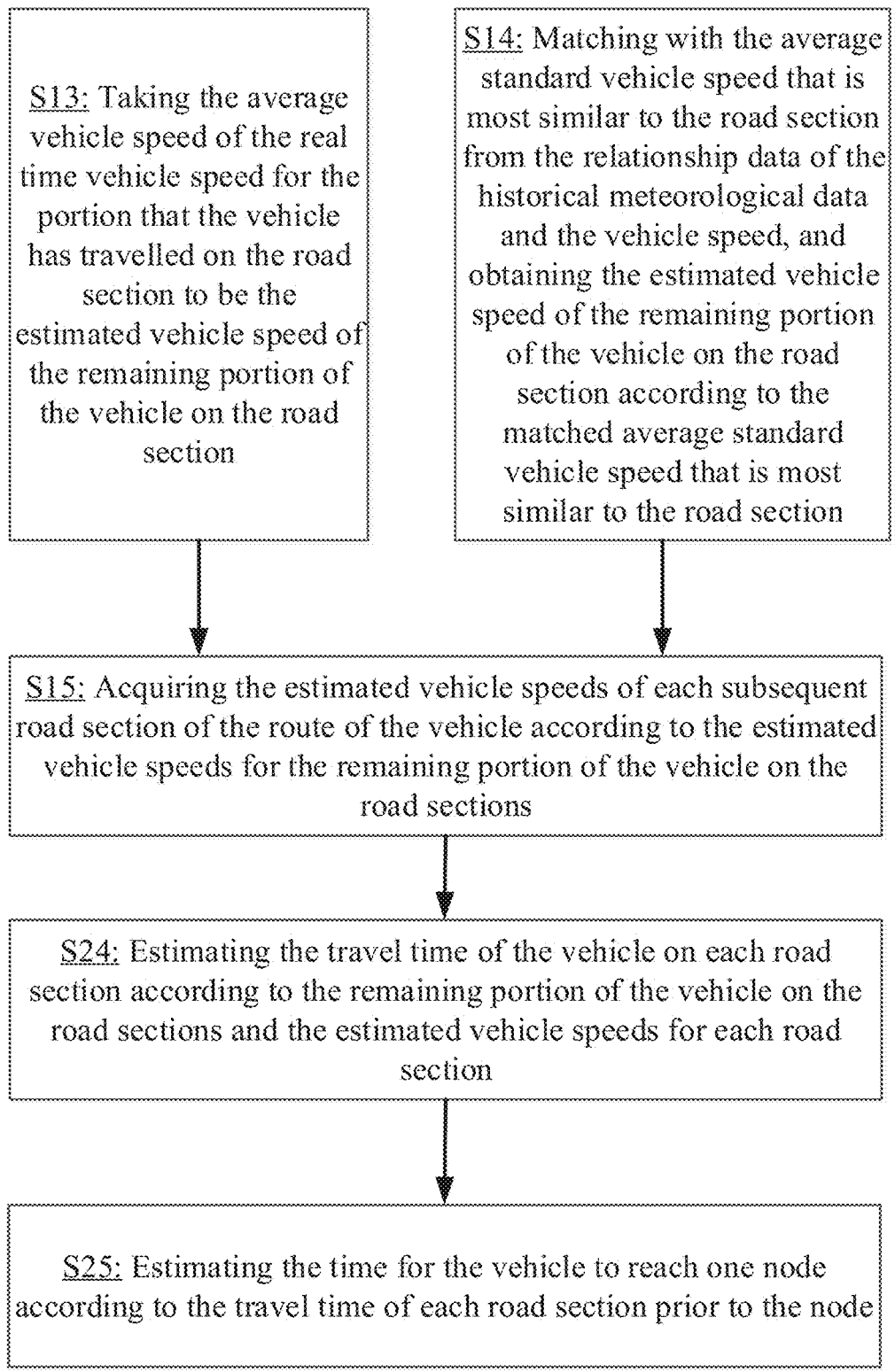
FIG. 13 shows a flow chart of a logistics monitoring method in yet another embodiment of this application.

As shown in FIG. 13, in a further embodiment of the logistics monitoring method of the present application, in Step S13, after using the average vehicle speed of the real time vehicle speed for the portion of the road section that has travelled as the estimated vehicle speed of the remaining portion of the vehicle on the road section, or in Step 14, after obtaining the estimated vehicle speed of the remaining portion of the vehicle on the road section according to the matched average standard vehicle speed that is most similar to the road section, it further comprises:

Step S15, acquiring the estimated vehicle speeds of each subsequent road section of the route of the vehicle according to the estimated vehicle speeds for the remaining portion of the vehicle on the road sections; and Correspondingly, Step S2, acquiring logistics monitoring data according to the estimated vehicle speeds, comprises:

Step S24, estimating the travel time of the vehicle on each road section according to the remaining portion of the vehicle on the road sections and the estimated vehicle speeds for each road section; and Step S25, estimating the time for the vehicle to reach one node according to the travel time of each road section prior to the node, and thereby to acquire a more accurate vehicle track estimate. Here, the node may be any one node before the destination of the vehicle travel, or it may also be the destination. A person skilled in the art of this field should be able to understand that the description of the above-described time for the vehicle to reach the node is only an example, and if other current or future descriptions of the time for the vehicle to reach the node are applicable to this application, they shall also fall within the protection scope of this application.

In a further embodiment of the logistics monitoring method of the present application, Step S25 further comprises, before estimating the time for the vehicle to reach one node according to the travel time of each road section prior to the node: establishing the correspondence relationship between the vehicle and the waybill. Here, the waybill is the freight handling document issued by the logistics company. One waybill ID corresponds to one piece or a group of freight (packages) accepted by a logistics company. The freight company monitors the status of circulation of waybills according to the information that is fed back by each outlet and transfer station. The chief effect of waybill monitoring includes: it is possible to let consumers to check the waybill tracking record and estimate the delivery time based on the waybill ID. For example, the waybill search results for a certain logistics company that are shown in FIG. 5. The logistics company can adjust the logistics plan based on the waybill monitoring and estimation results, for example it can change the vehicle travel route, increase the manpower for a logistics outlet, etc. It can determine the road section where a waybill is located according to the GPS information.

Waybill ID: ****; place of issue: Number *, *** Street, Haidian District, Beijing; place of receipt: Number *, ***** Street, Panyu District, Guangzhou

TABLE 5

| Date | Time | Tracking record |
|---|---|---|
| 2010 Mar. 8 | 16:19 | Beijing Zhongguancun . . . has received the mail, and it has entered the company's sorting system |
| 2010 Mar. 8 | 17:36 | The express mail has left Beijing Zhongguancun, and has been sent to Beijing |
| 2010 Mar. 8 | 18:45 | The express mail has arrived in Beijing and is currently being sorted, and the previous station is Beijing Zhongguancun |
| 2010 Mar. 8 | 19:52 | The express mail has left Beijing, and has been sent to the Guangzhou transfer department |
| 2010 Mar. 10 | 12:38 | The express mail has arrived at the Guangzhou transfer department and is currently being sorted, and the previous station is Beijing |
| 2010 Mar. 10 | 09:40 | The express mail has left the Guangzhou transfer department, and has been sent to Panyu, and it is estimated that it will be delivered at Number ***, *** Street, Panyu District in the afternoon |

Optionally, the waybills comprise the waybills that are already generated and the estimated waybills obtained based on the sales forecast results, and it is thereby possible to monitor the status of the processing of existing waybills and predicted waybills by monitoring the state of operation of the vehicles corresponding to the waybills.

Figure 14:
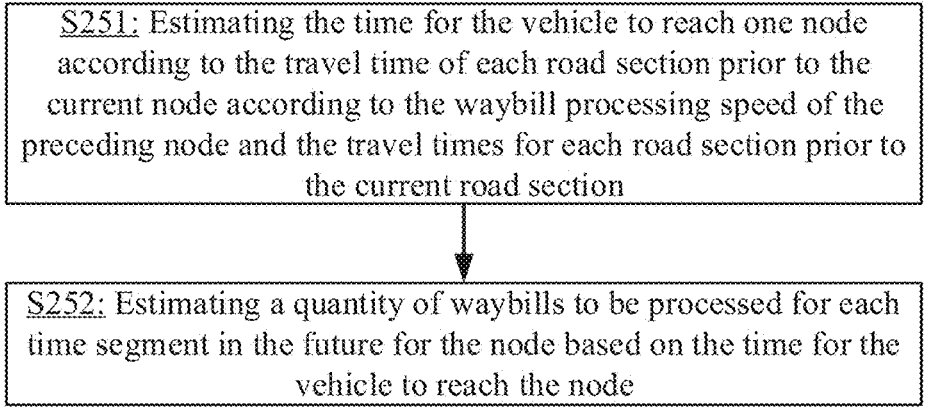
FIG. 14 shows a flow chart of a logistics monitoring method in still another embodiment of this application.

As shown in FIG. 14, in one embodiment of the logistics monitoring method of the present application, Step S25, estimating the time for the vehicle to reach one node according to the travel time of each road section prior to the node, comprises:

Step S251, estimating the time for the vehicle to reach one node according to the travel time of each road section prior to the current node and the waybill processing speed of the preceding node, and thereby estimating and obtaining a more accurate time for the vehicle to reach the current node. Here, the waybill processing speed of each node comprises the freight dispatch speed and processing speed, and for example it can be organized according to the waybill circulation information. The processing volume of some logistics nodes is not large, and they dispatch freight on time (logistics shuttle vehicle); the processing volume of some logistics nodes is large, and they dispatch freight at any time once a vehicle is fully loaded, and at this time the processing time at the transfer stations is closely related to the waybill volume and processing speed. Correspondingly, it is possible to accurately obtain the corresponding time when a waybill reaches a node based on the time when the vehicle reaches the node. A person skilled in the art of this field should be able to understand that the description of the above-described estimation of the time for the vehicle to reach the current node is only an example, and if other current or future descriptions of the estimation of the time for the vehicle to reach the current node are applicable to this application, they shall also fall within the protection scope of this application.

As shown in FIG. 14, in one embodiment, the logistics monitoring method of the present application, after Step S251 estimating the time for the vehicle to reach one node according to the waybill processing speed of the preceding node and the travel times for each road section prior to the current road section, further comprises:

Step S252, estimating the waybill quantity to be processed for each time segment in the future for the node based on the time for the vehicle to reach the node. Here, it is possible to integrate the circumstances of each line, and to estimate the waybill quantity that will be processed in the future at each logistics node, and this makes it possible to increase manpower based on the waybill quantity and to avoid overcrowding of warehouses in a timely manner. A person skilled in the art of this field should be able to understand that the description of the above-described waybill quantity to be processed for each time segment in the future is only an example, and if other current or future descriptions of the waybill quantity to be processed for each time segment in the future are applicable to this application, they shall also fall within the protection scope of this application, and are incorporated herein by reference.

Figure 15:
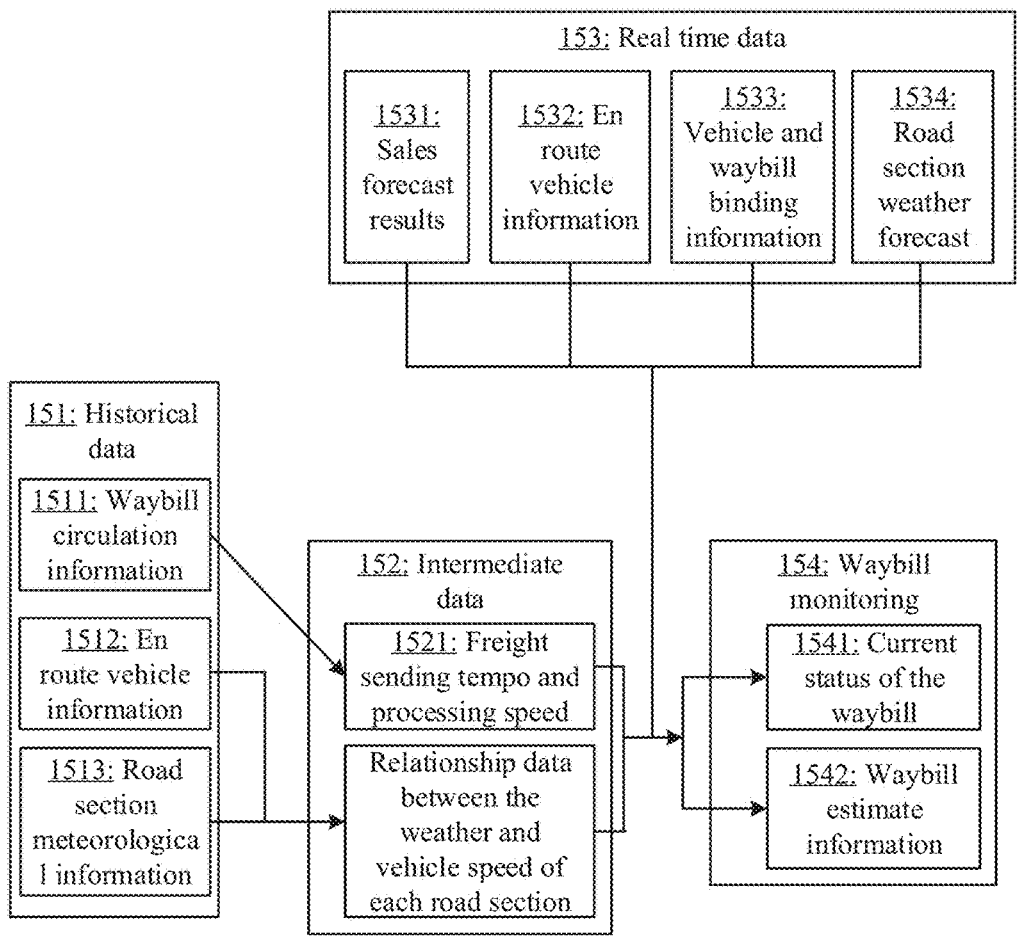
FIG. 15 shows a diagram showing operations of an embodiment of the present application.

As shown in FIG. 15, in an exemplary embodiment of the present application, it is possible to: from the historical data 151 such as the waybill circulation information 1511, the en route vehicle information 1512, and the road section meteorological information 1513, etc., organize and obtain the freight dispatch speed and processing speed 1521 of the nodes in the intermediate data 152 based on the waybill circulation information 1511, organize and obtain the relationship data between each road section's weather and the vehicle speed 1522 based on the en route vehicle information 1512 and the road section meteorological information 1513, and combine the freight dispatch speed and processing speed 1521 and the relationship data between each road section's weather and the vehicle speed 1522 with the real time data 153, to analyze and obtain the current status of the waybill 1541 and the waybill estimate information 1542 in the waybill monitoring 154. The current status of the waybill 1541 includes, for example: the inputted waybill number, the road section or node (outlet, transfer station) of the waybill obtained from searchable vehicle GPS information; and the waybill estimate information 1542 includes, for example: the corresponding time when the waybill will reach the node which can be accurately estimated based on the time when the vehicle will reach the node, or the quantity of waybills to be processed at each future time at the node which can be estimated based on the time when the vehicle will reach the node, etc. The real time data 153 may also comprise: the sales forecast results 1531, en route vehicle information 1532, vehicle and waybill binding information 1533, and road section weather forecast 1534. For example, the waybill circulation information 1511 in the historical data 151 may be records of the entry into and exit from each waybill node, and the format can be as shown in Table 6:

TABLE 6

| Waybill ID | Node ID | Time | Out/in |
|---|---|---|---|
| 50001 | 1 | 2014 May 7 13:25 | In |
| 50001 | 1 | 2014 May 7 16:12 | Out |
| 47203 | 2 | 2014 May 7 13:27 | In |
| ... | ... | ... | ... |

The en route vehicle information 1512, 1532 in the historical data 151 and real time data 153 can be sent back one time per minute by GPS, and the format can be like that shown in Table 7:

TABLE 7

| Vehicle ID | Time | Latitude | Longitude |
|---|---|---|---|
| 001 | 2014 May 7 13:21 | 122.594873 | 28.124576 |
| 001 | 2014 May 7 13:22 | 122.596820 | 28.130012 |
| ... | ... | ... | ... |

For example, the road section meteorological information in the historical data 151 and real time data 153 can be acquired from the national meteorological bureau, and this indicates the state of the weather at each time (accurate to the hour) in each road section. The sales forecast results 1531 in the real time data 153 may be an estimation of how many waybills will be generated in a future time segment, the freight sending cities and the freight receiving cities for these waybills and the transfer stations on the route. The vehicle and waybill binding information 1533 may show which waybills have been loaded on a vehicle that is currently operating.

Figure 16:
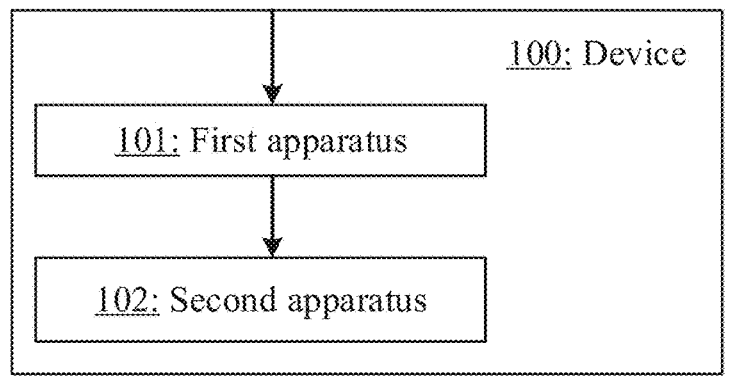
FIG. 16 shows a schematic diagram of a device for logistics monitoring in another aspect of the present application.

As shown in FIG. 16, the present application provides a logistics monitoring device 100, comprising:

a first apparatus 101 configured to obtain the estimated vehicle speed of a vehicle on a road section according to the meteorological and vehicle speed data of the road section; here, the meteorological data may comprise real time meteorological data and historical meteorological data, wherein the real time meteorological data comprises the current weather situation data and the current weather forecast data of each road section, and the meteorological data can be acquired through various meteorological channels, such as through a national meteorological bureau or other meteorological platform, for example, as shown in FIG. 4, it is possible to subdivide the highways and national roads of the entire country into road sections at county district level, and to provide real time meteorological data and historical meteorological data of each road section;

a second apparatus 102 configured to acquire logistics monitoring data according to the estimated vehicle speed. The present embodiment can structure the meteorological information in a form usable in logistics monitoring, and combine it with meteorological factors and road section information to acquire accurate logistics monitoring and estimation data. Since the time and space spans of long distance logistics are large, the effects of the meteorological factors on long distance logistics are relatively significant.

The embodiments of the present application are particularly applicable to long distance logistics between cities.

In one embodiment of the logistics monitoring method of the present application, the meteorological and vehicle speed data of the road section comprise: the real time meteorological data of the road section, real time vehicle speed of the vehicle, and the relationship data between the historical meteorological data and vehicle speed of the road section, thereby realizing the subsequent obtaining of accurate logistics monitoring data. Here, the real time vehicle speed of a vehicle can be obtained based on a GPS information calculation for the vehicle, and the GPS information can determine the road section where the vehicle is located. GPS refers to the global satellite positioning system. This system measures the distance between a satellite with a known location and the user receiver, after which it integrates the data of several satellites to calculate the position of the receiver, that is the vehicle. At present, the majority of the transport vehicles of major logistics companies have GPS receivers, and they are used to navigate and monitor vehicles and the location of freight.

In a further embodiment of the logistics monitoring method of the present application, the relationship data between the meteorological and vehicle speed data of the road section comprises the average standard vehicle speed of each vehicle type based on the historical meteorological data according to the road section and time segment, thereby realizing the subsequent obtaining of accurate logistics monitoring data. Here, the historical meteorological data can be categorized into 9 basic types: Normal (cloudy day, sunny day), light to moderate rain, heavy to violent rain, thunderstorm, freezing rain, major fog, small to moderate snow, heavy snow to blizzard, sand storm; the vehicle types can be classified based on the classification of freight loaded automobiles in the national standard for automobile classification (GB9417-89). For example, they are as shown in Table 8:

TABLE 8

| Vehicle type | Factory quantitative gross mass (GA) |
|---|---|
| Miniature | GA ≤ 1.8 tons |
| Small | 1.8 tons < GA ≤ 6 tons |
| Medium | 6 tons < GA ≤ 14 tons |
| Large | GA > 14 tons |

The average standard vehicle speed of each vehicle type based on the historical meteorological data according to the road section and time segment can be expressed as shown in Table 9:

TABLE 9

| Road section ID | Vehicle type | Road section | Historical meteorological data | Average standard vehicle speed (km/h) |
|---|---|---|---|---|
| 01 | Small | 2014 May 7 12:00-13:00 | Normal | 85 |
| 01 | Small | 2014 May 7 13:00-14:00 | Small to medium rain | 60 |
| ... | | | | |
| 02 | Medium | 2014 May 7 00:00-01:00 | Normal | 75 |
| 02 | Medium | 2014 May 7 01:00-02:00 | Thunderstorm | 30 |

For example, the method for calculating the average standard vehicle speed based on the historical meteorological data for a certain time segment, certain road section, and certain vehicle type can be as shown below:

The average standard vehicle speed based on the historical meteorological data for a certain time segment, certain road section, and certain vehicle type=(the sum of the travel distance for vehicles of the vehicle type in the time segment on the road section based on the historical meteorological data)/(the sum of the travel time for vehicles of the vehicle type in the time segment on the road section based on the historical meteorological data).

For example, statistics are compiled for the average vehicle speed for a certain road section for 12:00-13:00, wherein:

small vehicle 1 travelled on the road section from 12:23-13:00 under normal weather, the travel time was 0.52 hours, and the travel speed was 40 km;

small vehicle 2 travelled on the road section from 12:02-12:50 under normal weather, the travel time was 0.6 hours, and the travel speed was 60 km (to travel the entire road section);

. . .

Thus, the average standard vehicle speed based on the historical meteorological data for the certain time segment, certain road section and certain vehicle type=(40+ 60+ . . . )/(0.52+0.6+ . . . ). A person skilled in the art of this field should be able to understand that the description of the above-described relationship between the historical meteorological data and vehicle speed of the road section is only an example, and if other current or future descriptions of the relationship data between the historical meteorological data and vehicle speed of the road section are applicable to this application, they shall also fall within the protection scope of this application.

Figure 17:
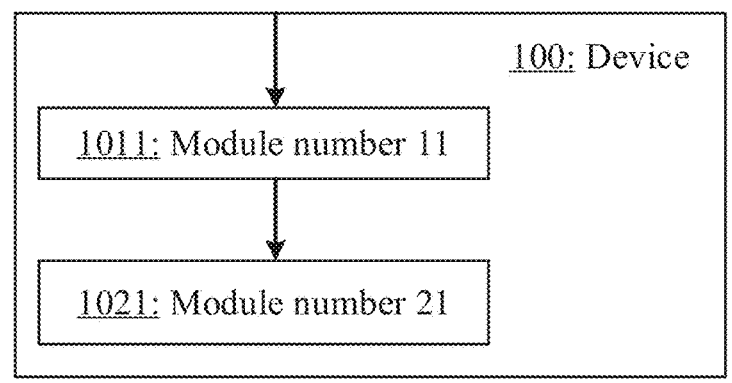
FIG. 17 shows a schematic diagram of a device for logistics monitoring in a further aspect of the present application.

As shown in FIG. 17, in one embodiment of the logistics monitoring device of the present application, the first apparatus 101 comprises:

Module number 11 (1011) configured to obtain the average standard vehicle speed corresponding to the vehicle type of the vehicle based on the historical meteorological data of the current road section and time segment, according to the meteorological data of the vehicle on the current road section and the average standard vehicle speed of each vehicle type based on the historical meteorological data according to the current road section and time segment, that is, obtaining the first estimated vehicle speed for the road section; and the second apparatus 102 comprises:

Module number 21 (1021) configured to determine whether the current road section is congested according to the vehicle flow rate on the current road section, the real time vehicle speed, and the corresponding average standard vehicle speed, and thereby on the one hand it is possible to accurately monitor the state of congestion of the current road section, and on the other hand it is possible to provide an analytical basis for subsequent further logistics monitoring. Here, it is possible to comprehensively consider the factors of the vehicle flow rate of the current road section, and compare if the real time vehicle speed is smaller than the corresponding average standard speed for at least one preset threshold, and then determine that the current road section is congested. A person skilled in the art of this field should be able to understand that the description of the above-described determination of whether the road section is congested is only an example, and if other current or future descriptions of the determination of whether the road section is congested are applicable to this application, they shall also fall within the protection scope of this application.

In a further embodiment of the logistics monitoring device of the present application, the first apparatus 101 further comprises Module number 12 (1012) configured to determine whether the time for the vehicle to travel on the remaining portion of the current road section with the average vehicle speed of the real time vehicle speed for the portion that the vehicle has traveled on the current road section is smaller than a preset threshold, and if it is smaller than the preset threshold, it takes the average vehicle speed of the real time vehicle speed for the portion that the vehicle has traveled on the road section to be the estimated vehicle speed of the remaining portion of the vehicle on the road section, thereby obtaining the second estimated vehicle speed of the road section; and if it is not smaller than the preset threshold, it matches with the average standard vehicle speed that is most similar to the road section from the relationship data of the historical meteorological data and the vehicle speed, and obtains the estimated vehicle speed of the vehicle on the remaining portion of the road section according to the matched average standard vehicle speed that is most similar to the road section, thereby obtaining the second estimated vehicle speed of the road section. Here, the preset threshold can be set at a relatively short time such as 1 hour, and if the time for the vehicle to travel over the remaining portion of the current road section at the average vehicle speed of the real time vehicle speed of the portion of the current road section that it has travelled over is smaller than the preset threshold, then ordinarily then the likelihood of weather changes is not large within the short time of the preset threshold, and if the estimated vehicle speed at which the vehicle can travel over the remaining portion of the current road section at the average vehicle speed of the real time vehicle speed of the portion of the current road section that it has travelled over is conversely larger than or equal to the preset threshold, then ordinarily then the likelihood of weather changes is relatively large within the relatively long time that is larger than the preset threshold, and matching is done with the average standard vehicle speed that is most similar to the road section from the relationship data of the historical meteorological data and the vehicle speed, and the estimated vehicle speed of the remaining portion of the vehicle on the road section is obtained according to the matched average standard vehicle speed that is most similar to the road section, and the vehicle travels over the remaining part of the current road section at this estimated speed. The accurate estimated vehicle speed of the vehicle on the remaining portion of the road section obtained for these two situations here can provide a data basis for subsequent accurate acquiring of logistics monitoring data. For example, as in FIG. 7, assuming that a certain vehicle (let us assume medium sized vehicle) drives on number i road sections between node 1 and node 2, and assuming that the vehicle's current location is F:

$T_0$=Current accurate time at the vehicle's current location (if it is an integral point accurate time);

L=Length of the portion that the vehicle has travelled on the current road section;

$L_0$=Length of the remaining portion of the current road section;

$L_i$=Length of the subsequent number i road sections, i=1, 2, 3, . . . ;

Amount of time required to reach node 2

$t = t_0 + t_1 + t_2 + \ldots$

Here $t_i$ is the driving time for road section $L_i$, i=1, 2, 3, . . . ;

In order to calculate $t_0$, assume $v_0$=The average speed of the real time speed of the portion L already driven by the vehicle There can be two situations:

If $L_0/v_0 <= 1$ hour, then $t_0 = L_0/v_0$.

Otherwise, after 1 hour, assume that the weather forecast for the $L_1$ road section at 14:00-15:00 is as shown in Table 10:

TABLE 10

| Time segment | Weather | Temperature (C.) | Wind force (grade) | Precipitation (mm) |
|---|---|---|---|---|
| 2014 May 8 14:00-15:00 | Small to moderate rain | 16 | 5 | 6 |

Thus, the average standard vehicle speed that is most similar to the road section can be matched from the relationship data of the historical meteorological data and the vehicle speed, and the estimated vehicle speed $v_0'$ of the remaining portion of the vehicle on the road section can be obtained according to the matched average standard vehicle speed that is most similar to the road section. A person skilled in the art of this field should be able to understand that the description of the above-described estimated vehicle speed of the remaining portion of the vehicle on the road section is only an example, and if other current or future descriptions of the estimated vehicle speed of the remaining portion of the vehicle on the road section are applicable to this application, they shall also fall within the protection scope of this application, and are incorporated herein by reference.

In a further embodiment of the logistics monitoring device of the present application, the matching with the average standard vehicle speed that is most similar to the road section from the relationship data of the historical meteorological data and the vehicle speed comprises one of the following:

seeking, from the relationship data between the historical meteorological data and vehicle speed, the vehicle speed for the same road section and same time segment with the same weather as the matched average standard vehicle speed that is most similar to the road section;

seeking, from the relationship data between the historical meteorological data and vehicle speed, the vehicle speed for the same road section and a similar time segment with the same weather as the matched average standard vehicle speed that is most similar to the road section; and seeking, from the relationship data between the historical meteorological data and vehicle speed, the vehicle speed for a similar road section as the matched average standard vehicle speed that is most similar to the road section. By any of these three items, it is possible to obtain a relatively accurate average standard vehicle speed that is most similar to the road section. A person skilled in the art of this field should be able to understand that the description of the above-described matching with the average standard vehicle speed that is most similar to the road section is only an example, and if other current or future descriptions of the matching with the average standard vehicle speed that is most similar to the road section are applicable to this application, they shall also fall within the protection scope of this application.

In one embodiment of the logistics monitoring method of the present application, the matching with the average standard vehicle speed that is most similar to the road section from the relationship data of the historical meteorological data and the vehicle speed comprises:

seeking, from the relationship data between the historical meteorological data and vehicle speed, the vehicle speed for the same road section and same time segment with the same weather, and if there is such vehicle speed, using the vehicle speed as the matched average standard vehicle speed that is most similar to the road section;

if there is no such vehicle speed, seeking, from the relationship data between the historical meteorological data and vehicle speed, the vehicle speed for the same road section and a similar time segment with the same weather, and if there is such vehicle speed, using the vehicle speed as the matched average standard vehicle speed that is most similar to the road section;

and if there is no such vehicle speed, seeking, from the relationship data between the historical meteorological data and vehicle speed, the vehicle speed for a similar road section as the matched average standard vehicle speed that is most similar to the road section. Here, the accuracy of the average standard vehicle speed that is most similar to the road section that is obtained in the above-described steps may decline successively, so if a preceding step is applicable, the preceding step will preferably be applied, and the following step(s) may not be applied, and a relatively accurate average standard vehicle speed that is most similar to the road section will be obtained thereby. A person skilled in the art of this field should be able to understand that the description of the above-described matching with the average standard vehicle speed that is most similar to the road section is only an example, and if other current or future descriptions of the matching with the average standard vehicle speed that is most similar to the road section are applicable to this application, they shall also fall within the protection scope of this application.

For example, estimating the estimated vehicle speed $v_0'$ of the remaining portion of the road section can be realized by the following process:

Step I: seeking, from the relationship data between the historical meteorological data and vehicle speed, the vehicle speed for the same road section and same time segment with the same weather as the matched average standard vehicle speed that is most similar to the road section. For example, when seeking, from the relationship data between the historical meteorological data and vehicle speed, the most recent similar weather conditions for the same road section in the same time segment (14:00-15:00), the average travel speed of a vehicle of the same type is v', that is, the matched average standard vehicle speed that is most similar to the road section. The speed coefficient of the vehicle r is calculated, and r=the average vehicle speed of the real time vehicle speed for the portion over which the vehicle has travelled L/the average speed for the portion over which vehicles of the same type have already travelled L, wherein the average vehicle speed of the real time vehicle speed for the portion over which the vehicle has travelled L can be obtained according to GPS data, and the average speed for the portion over which vehicles of the same type have already travelled L can be obtained by matching from the relationship data between the historical meteorological data and vehicle speed. Here, the calculation of the speed coefficient r is added, and it is possible to make the estimated speed for the remaining portion of the vehicle on the road section more accurate. Then, according to the matched average standard vehicle speed that is most similar to the road section it is possible to obtain the estimated speed for the remaining portion of the vehicle on the road section $v_0'=rv'$; in addition, if similar weather conditions have not appeared in the same time segment, Step II is implemented;

Step II: seeking, from the relationship data between the historical meteorological data and vehicle speed, the vehicle speed for the same road section and a similar time segment with the same weather as the matched average standard vehicle speed that is most similar to the road section. In other words, when the most recent similar weather conditions appeared for the same road section in a similar time segment, the average travel speed of a vehicle of the same type is v', that is, the matched average standard vehicle speed that is most similar to the road section. Then the estimated vehicle speed for the remaining portion of the vehicle on the road section $v_0'=r\rho v'$ is obtained according to the matched average standard vehicle speed that is most similar to the road section. Here $\rho$ is the average vehicle speed in normal weather for the same time segment and same road section or the average vehicle speed in normal weather for a similar time segment and same road section. Here, the definition of similar time segment can be: taking the data for the latest period of time, for example one week, comparing the difference between the average vehicle speeds for two time segments (after normalization) under normal weather; and when the difference is <0.1, it is a similar time segment.

For example, 24 time segments (time segment 1 (0:00-1:00), time segment 2 (1:00-2:00), . . . , time segment 24 (23:00-24:00)) and the average vehicle speed for the most recent one week under normal weather are shown in FIG. 9, based on which normalization can be conducted for the vehicle speed, that is the vehicle speed after normalization=(vehicle speed−minimum vehicle speed)/(maximum vehicle speed−minimum vehicle speed), and the vehicle speed after normalization that is shown in FIG. 10 is obtained. In FIG. 10, time segments 8, 9, 10, 12 and 16 are the time segments that are similar to time segment 15 (14:00-15:00). If the same weather conditions have not appeared in any of these time segments, then Step III is implemented. If the same weather conditions have recently appeared in one of these time segments, for example time segment 8, then the estimated vehicle speed for the remaining portion of the vehicle on the road section $v_0'=r*$the vehicle speed when similar weather conditions appeared in time segment 8*(the average vehicle speed for normal weather in time segment 15/the average vehicle speed for normal weather in time segment 8).

Step III: seeking, from the relationship data between the historical meteorological data and vehicle speed, the vehicle speed for a similar road section as the matched average standard vehicle speed that is most similar to the road section. The method for calculating road section similarity can be taking the same time segment such as one week for the latest period of time and the data for same vehicle types for similar time segments, comparing the current road section and every other road section under various weather conditions. The similarity coefficient for the two road sections can be defined as=absolute value of the speed difference of the two road sections/sum of the speeds of the two road sections. Then the mean is acquired according to different weather conditions, for example as shown in Table 11:

TABLE 11

| Weather | Road section 01 | Road section 02 |
|---|---|---|
| Normal | 75 | 65 |
| Small to moderate rain | 64 | 57 |
| . . . | | |

Thus, similarity coefficient for the two road sections= (|75−65|/(75+65)+|64−57|/(64+57) . . . )/number of weather types. Finally the corresponding road section with the minimum similarity coefficient of the two road sections is acquired, and this is the matched similar road section, and subsequently it is possible to obtain the estimated vehicle speed of the vehicle on the remaining portion of the road section according to the matched similar road section.

Figure 18:
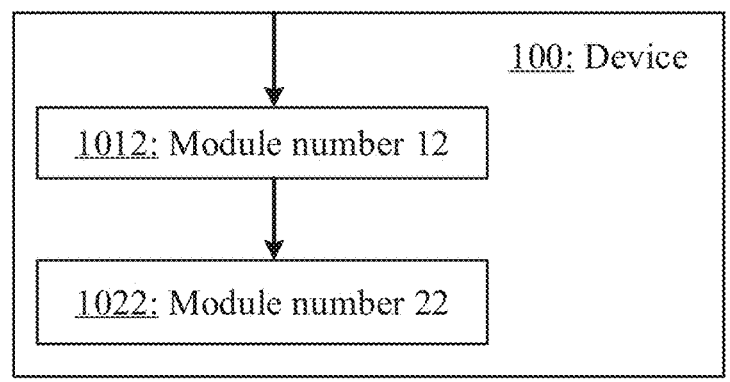
FIG. 18 shows another schematic diagram of a device for logistics monitoring in a further aspect of the present application.

As shown in FIG. 18, in one embodiment of the logistics monitoring device of the present application, the second apparatus 102 further comprises:

module number 22 (1022) configured to acquire the congestion duration time for the road section according to the vehicle flow rate on the current road section and the estimated vehicle speed of the remaining portion, and to acquire more accurate information about the state of logistics thereby. Here, when the congestion time of the road section is acquired, in addition to taking into consideration such factors as the vehicle flow rate on the current road section and the estimated vehicle speed for the remaining portion, it is also possible to consider the vehicle flow rate and the estimated vehicle speed for the neighboring road sections to the front and the rear of the current road section, and to obtain a more accurate congestion duration time for the current road section thereby. A person skilled in the art of this field should be able to understand that the description of the above-described acquisition of the congestion duration time for the road section is only an example, and if other current or future descriptions of the acquisition of the congestion duration time for the road section that is most similar to the road section are applicable to this application, they shall also fall within the protection scope of this application.

Figure 19:
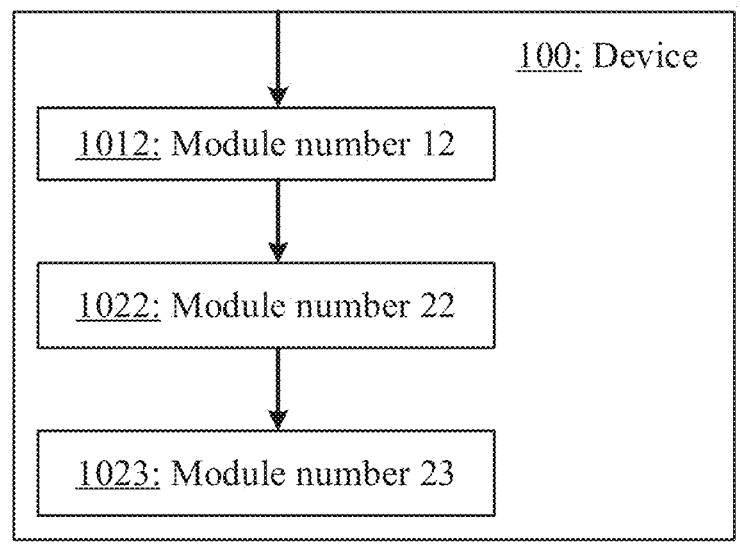
FIG. 19 shows yet another schematic diagram of a device for logistics monitoring in another aspect of the present application.

As shown in FIG. 19, in a further embodiment of the logistics monitoring device of the present application, the second apparatus 102 further comprises:

module number 23 (1023) configured to adjust the route of the vehicle passing through the road section, when the congestion duration time is larger than the preset threshold. Here, when a long-term delay might occur in a certain road section, it is possible to carry out re-planning and adjustment to the route of the vehicle on the road section in order to raise the logistics transportation efficiency.

Figure 20:
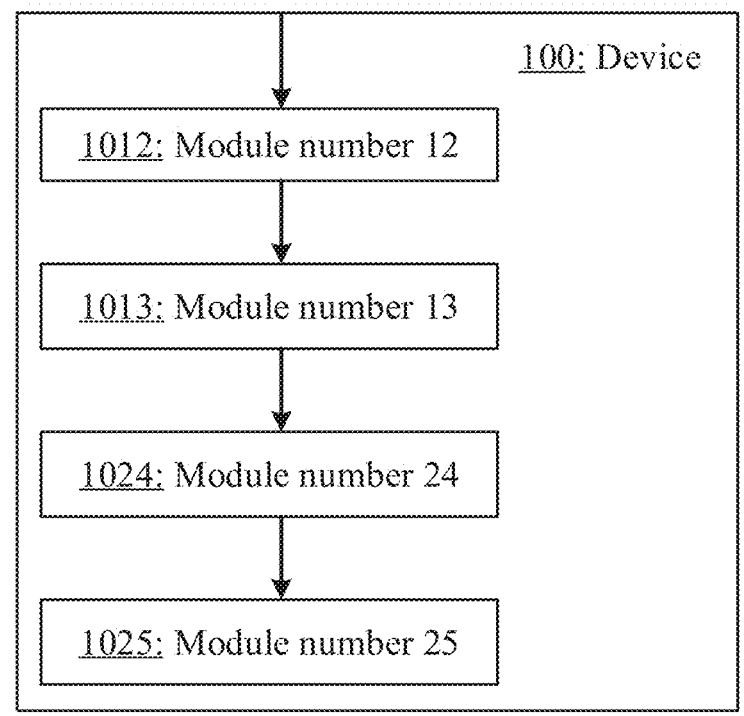
FIG. 20 shows still another schematic diagram of a device for logistics monitoring in another aspect of the present application.

As shown in FIG. 20, in one embodiment of the logistics monitoring device of the present application, the first apparatus 101 further comprises:

Module number 13 (1013) configured to acquire the estimated vehicle speeds of each subsequent road section of the route of the vehicle according to the estimated vehicle speeds for the remaining portion of the vehicle on the road sections; and And the second apparatus 102 further comprises:

Module number 24 (1024) configured to estimate the travel time of the vehicle on each road section according to the remaining portion of the vehicle on the road sections and the estimated vehicle speeds for each road section; and Module number 25 (1025) configured to estimate the time for the vehicle to reach one node according to the travel time of each road section prior to the node, and thereby to acquire a more accurate vehicle track estimate. Here, the node may be any one node before the destination of the vehicle travel, or it may also be the destination. A person skilled in the art of this field should be able to understand that the description of the above-described time for the vehicle to reach the node is only an example, and if other current or future descriptions of the time for the vehicle to reach the node are applicable to this application, they shall also fall within the protection scope of this application.

Figure 21:
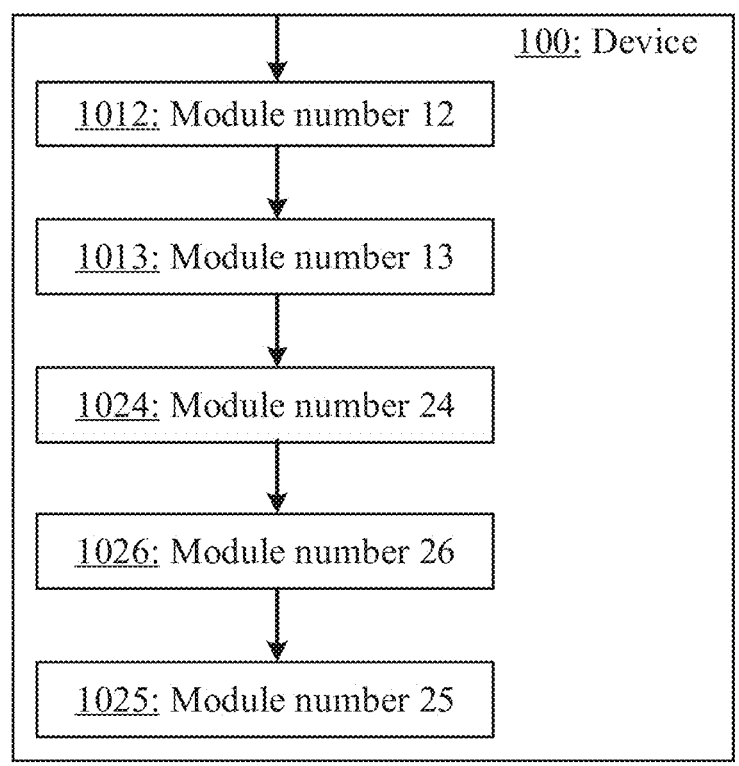
FIG. 21 shows another schematic diagram of a device for logistics monitoring in another aspect of the present application.

As shown in FIG. 21, in a further embodiment of the logistics monitoring device of the present application, the second apparatus 102 further comprises:

Module number 26 (1026) configured to establish the correspondence relationship between the vehicle and the waybill. Here, the waybill is the freight handling document issued by the logistics company. One waybill ID corresponds to one piece or a group of freight (packages) accepted by a logistics company. The freight company monitors the status of circulation of waybills according to the information that is fed back by each outlet and transfer station. The chief effect of waybill monitoring is: it is possible to let consumers to check the waybill tracking record and estimate the delivery time based on the waybill ID. For example, the waybill search results for a certain logistics company that are shown in FIG. 5. The logistics company can adjust the logistics plan based on the waybill monitoring and estimation results, for example it can change the vehicle travel route, increase the manpower for a logistics outlet, etc. It can determine the road section where a waybill is located according to the GPS information.

Waybill ID: ****; place of issue: Number *, *** Street, Haidian District, Beijing; place of receipt: Number *, ***** Street, Panyu District, Guangzhou

TABLE 12

| Date | Time | Tracking record |
| --- | --- | --- |
| 2010 Mar. 8 | 16:19 | Beijing Zhongguancun . . . has received the mail, and it has entered the company's sorting system |
| 2010 Mar. 8 | 17:36 | The express mail has left Beijing Zhongguancun, and has been sent to Beijing |
| 2010 Mar. 8 | 18:45 | The express mail has arrived in Beijing and is currently being sorted, and the previous station is Beijing Zhongguancun |
| 2010 Mar. 8 | 19:52 | The express mail has left Beijing, and has been sent to the Guangzhou transfer department |
| 2010 Mar. 10 | 12:38 | The express mail has arrived at the Guangzhou transfer department and is currently being sorted, and the previous station is Beijing |
| 2010 Mar. 10 | 09:40 | The express mail has left the Guangzhou transfer department, and has been sent to Panyu, and it is estimated that it will be delivered at Number ***, *** Street, Panyu District in the afternoon |

In one embodiment of the device that is used for logistics monitoring in the present application, the waybills comprise the waybills that are already generated and the estimated waybills obtained based on the sales forecast results, and it is thereby possible to monitor the status of the processing of existing waybills and predicted waybills by monitoring the state of operation of the vehicles corresponding to the waybills.

In a preferred embodiment of the logistics monitoring method of the present application, the module number 25 (1025) is used to estimate the time for the vehicle to reach one node according to the travel time of each road section prior to the current node according to the waybill processing speed of the preceding node and the travel times for each road section prior to the current road section, and thereby estimating and obtaining a more accurate time for the vehicle to reach the current node. Here, the waybill processing speed of each node comprises the freight dispatch speed and processing speed, and for example it can be organized according to the waybill circulation information. The processing volume of some logistics nodes is not large, and they dispatch freight on time (logistics shuttle vehicle); the processing volume of some logistics nodes is large, and they dispatch freight at any time once a vehicle is fully loaded, and at this time the processing time at the transfer stations is closely related to the waybill volume and processing speed. Correspondingly, it is possible to accurately obtain the corresponding time when a waybill reaches a node based on the time when the vehicle reaches the node. A person skilled in the art of this field should be able to understand that the description of the above-described estimation of the time for the vehicle to reach the current node is only an example, and if other current or future descriptions of the estimation of the time for the vehicle to reach the current node are applicable to this application, they shall also fall within the protected scope of this application, and are incorporated herein by reference.

Figure 22:
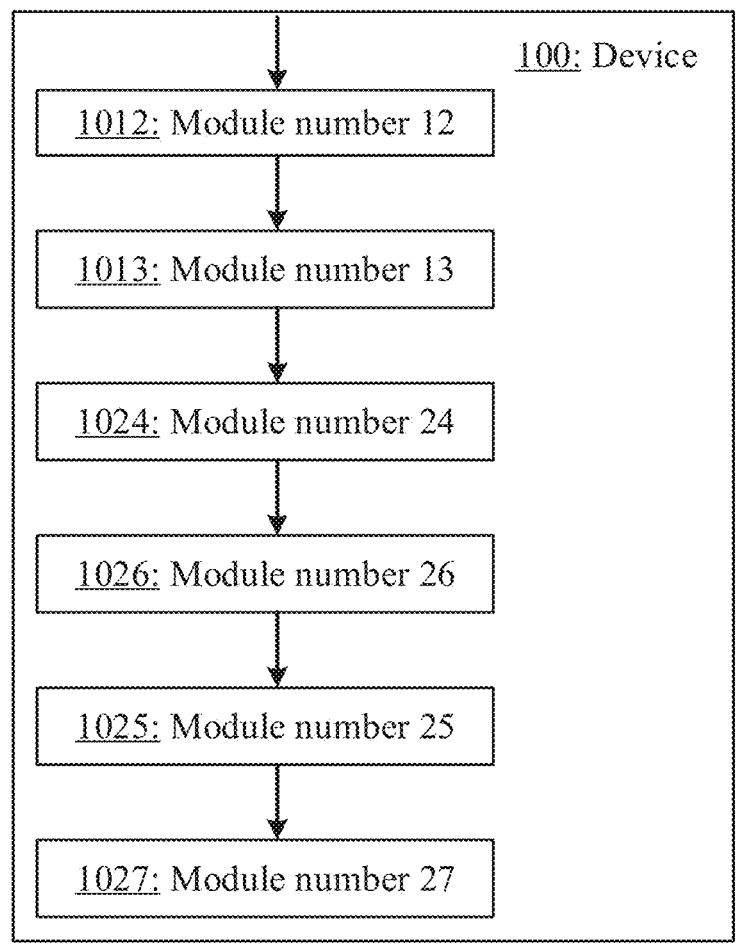
FIG. 22 shows yet another schematic diagram of a device for logistics monitoring in another aspect of the present application.

As shown in FIG. 22, in a further embodiment of the logistics monitoring method of the present application, the second apparatus 102 further comprises:

module number 27 (1027) configured to estimate the waybill quantity to be processed for each time segment in the future for the node based on the time for the vehicle to reach the node. Here, it is possible to integrate the circumstances of each line, and to estimate the waybill quantity that will be processed in the future at each logistics node, and this makes it possible to increase manpower based on the waybill quantity and to avoid overcrowding of warehouses in a timely manner. A person skilled in the art of this field should be able to understand that the description of the above-described waybill quantity to be processed for each time segment in the future is only an example, and if other current or future descriptions of the waybill quantity to be processed for each time segment in the future are applicable to this application, they shall also fall within the protection scope of this application, and are incorporated herein by reference.

In view of the above, with the estimated vehicle speed of a vehicle on a road section according to the meteorological and vehicle speed data of the road section, logistics monitoring data according to the estimated vehicle speed, meteorological information, and it is possible to acquire accurate logistics monitoring and estimation data. Since the time and space spans of long distance logistics are large, the effects of the meteorological factors on long distance logistics are relatively great. The embodiments of this application are applicable to monitoring long distance logistics between cities.

According to some embodiments, the meteorological and vehicle speed data of the road section described in the present application can comprise: the real time meteorological data of the road section, real time vehicle speed of the vehicle and the relationship data between the historical meteorological data and vehicle speed of the road section, wherein the relationship data between the historical meteorological data and vehicle speed of the road section comprises the average standard vehicle speed of each vehicle type based on the historical meteorological data according to the road section and time segment, and therefore it is possible to realize subsequent obtaining of accurate logistics monitoring data.

As discussed above, the embodiments of the present application can determine whether the current road section is congested according to the vehicle flow rate on the current road section, the real time vehicle speed, and the corresponding average standard vehicle speed, and on the one hand it is possible to accurately monitor the state of congestion of the current road section, and on the other hand it is possible to provide an analytical basis for subsequent further logistics monitoring.

Some of the embodiments of the present application take the average vehicle speed of the real time vehicle speed for the portion that the vehicle has traveled on the road section to be the estimated vehicle speed of the remaining portion of the vehicle on the road section, or matches with the average standard vehicle speed that is most similar to the road section from the relationship data of the historical meteorological data and the vehicle speed, and obtains the estimated vehicle speed of the remaining portion of the vehicle on the road section according to the matched average standard vehicle speed that is most similar to the road section, and it can separate into different situations and obtain the accurate estimated vehicle speed for the remaining portion of the vehicle on the road section, and thereby provide a monitoring basis for the subsequent accurate acquisition of logistics monitoring data.

According to some embodiments, when it is determined that the current road section is congested, the congestion duration time for the road section can be acquired according to the vehicle flow rate on the current road section and the estimated vehicle speed of the remaining portion, and more accurate information about the state of logistics is acquired thereby; and in addition, when the congestion duration time is larger than the preset threshold, the route of the vehicle passing through the road section can be adjusted in order to raise the logistics transportation efficiency.

Further, the embodiments of the present application can estimate the travel time of the vehicle on each road section according to the remaining portion of the vehicle on the road sections and the estimated vehicle speeds for each road section, and estimates the time for the vehicle to reach one node according to the travel time of each road section prior to the node, and thereby acquire a more accurate vehicle track estimate.

Moreover, the embodiments of the present application can establish the correspondence relationship between the vehicle and the waybills, and monitor the state of circulation of the waybills, and in addition estimate the time for the vehicle to reach the current node according to the travel time of each road section prior to the current node according to the waybill processing speed of the preceding node and the travel times for each road section prior to the current road section, and thereby estimates and obtains the accurate time for a vehicle to reach the current node, and in addition estimate the waybill quantity to be processed for each time segment in the future for the node based on the time for the vehicle to reach the node, and this makes it possible to increase manpower based on the waybill quantity and to avoid overcrowding of warehouses in a timely manner.

A person skilled in the art of this field can undertake various improvements and modifications of this application and not deviate from the spirit and scope of this application. Thus, if these improvements and modifications of this application fall within the scope of the claims of this application and an equivalent technique, this application intends to cover these improvements and modifications within it.

This application can be embodied in software and/or an aggregate of software/hardware, and it can be realized with an application-specific integrated circuit (ASIC), a general purpose computer or any other kind of hardware device. In one embodiment, the software program of the present application can execute the steps or functions described in the text above by means of a processor. Similarly, the software program of the present application (including the related data structure) can be stored on a computer readable storage medium, for example, a RAM storage device, a magnetic or optical drive device, or floppy magnetic disk or similar device. In addition, some of the steps or functions of this application can be realized with hardware, for example, a circuit that coordinates with the processor in executing each step or function.

In addition, a part of this application can be applied to computer program products, for example computer program instructions (i.e., code), and when this is executed by the computer, it can call or provide the method and/or technical scheme according to this application based on the operation of the computer. Any process descriptions, elements, or blocks in the flow diagrams described herein and/or depicted in the attached figures should be understood as representing steps, or modules, segments, or portions of code which include one or more executable instructions for implementing specific logical functions. Moreover, the program instructions that correspond to the steps of the method of this application can be stored in a fixed or mobile recording medium, and/or be transmitted by the data stream in broadcasting or another signal bearing medium, and/or be stored in the work storage device of a computer device that is running according to the program instructions. For example, an embodiment according to the present application can comprise one apparatus, and the apparatus comprises a storage device that is used to store the computer program instructions and a processor that is used to execute the program instructions, wherein when the computer program instructions are executed by the processor, this triggers on the method and/or technical scheme whereby the apparatus operates based on the above-described several embodiments according to the present application.

For a person skilled in the art of this field, this application is not limited to the details of the above-described exemplary embodiments, and on condition that there is no deviation from the spirit or basic characteristics of this application a person skilled in the art of this field can realize this application by other modes of embodiment. Therefore, the embodiments should be considered as exemplary and non-restrictive, and the scope of this application is limited by the attached claims and not the specification, and therefore the gist is that all changes within the meaning and scope that fall in the equivalent requirements of the claims are covered within this application. None of the markings of the attached figures in the claims should be viewed as limiting the claims involved. In addition, the word "comprise(s)" do not exclude other units or steps, and the singular does not exclude the plural. The multiple units or apparatuses described in the apparatus claims can also be realized by one unit or apparatus by means of software or hardware. The words "first", "second", etc. are used to express the name, and do not indicate any specific order.

The invention claimed is:

1. A method of logistics monitoring, comprising:
   determining, remotely from a vehicle, a road section that the vehicle is travelling on and a time segment;
   obtaining historical vehicle speed data on the road section associated with historical meteorological data of the road section and time segment, wherein the historical vehicle speed data comprises an average standard vehicle speed of each of a plurality of vehicle types;
   obtaining current meteorological data;
   obtaining an estimated vehicle speed of the vehicle on the road section based on the current meteorological data, historical meteorological data, and historical vehicle speed data, wherein obtaining an estimated vehicle speed of the vehicle on the road section based on the current meteorological data, historical meteorological data, and historical vehicle speed data comprises obtaining an average standard vehicle speed corresponding to a vehicle type of the vehicle;

determining, after obtaining the average standard vehicle speed corresponding to the vehicle's vehicle type, whether the time for the vehicle to travel on a remaining portion of the road section with an average vehicle speed for the portion of the road section that the vehicle has traveled is smaller than a preset threshold;

in response to determining that the time is smaller than the preset threshold, taking the average vehicle speed for the portion of the road section that the vehicle has traveled to be the estimated vehicle speed for the remaining portion of the vehicle on the road section; and in response to determining that the time is not smaller than the preset threshold, identifying a matched average standard vehicle speed that is associated to the road section, the matched average standard vehicle speed being identified from the historical meteorological data and the historical vehicle speed, and obtaining the estimated vehicle speed of the remaining portion of the vehicle on the road section according to the matched average standard vehicle speed that is associated to the road section;

determining, remotely from the vehicle, a real time speed of the vehicle; and if the real time speed is less than the estimated vehicle speed, and the difference between the real time speed and the estimated vehicle speed is greater than a threshold, determining that the road section is congested.

2. The method according to claim 1, wherein matching with the average standard vehicle speed that is associated to the road section from the relationship data of the historical meteorological data and the historical vehicle speed comprises one of the following:

seeking, from the historical meteorological data and the historical vehicle speed, a vehicle speed for the same road section and same time segment with the same weather as the matched average standard vehicle speed that is associated to the road section;

seeking, from the historical meteorological data and the historical vehicle speed, a vehicle speed for the same road section and another similar time segment with the same weather as the matched average standard vehicle speed that is associated to the road section; and seeking, from the historical meteorological data and the historical vehicle speed, a vehicle speed for another road section as the matched average standard vehicle speed that is associated to the road section.

3. A method of logistics monitoring, comprising:

obtaining an estimated vehicle speed of a vehicle on a road section according to meteorological and vehicle speed data of the road section, wherein the meteorological and vehicle speed data of the road section comprises real time meteorological data of the road section, real time vehicle speed of the vehicle, and relationship data between historical meteorological data and vehicle speed of the road section, wherein the relationship data between the historical meteorological data and the vehicle speed of the road section comprises an average standard vehicle speed of each vehicle type of a plurality of vehicle types based on the historical meteorological data according to the road section and a time segment, and wherein obtaining the estimated vehicle speed of the vehicle on the road section obtained based on the meteorological and the vehicle speed data of the road section comprises obtaining an average standard vehicle speed corresponding to a vehicle type of the vehicle based on the historical meteorological data of the road section and time segment, according to the meteorological data of the vehicle on the road section and the average standard vehicle speed of each vehicle type based on the historical meteorological data of the road section and time segment;

determining, after obtaining the average standard vehicle speed corresponding to the vehicle type of the vehicle, whether the time for the vehicle to travel on a remaining portion of the road section with an average of the real time vehicle speed for a portion of the road section that the vehicle has traveled is smaller than a preset threshold;

in response to determining that the time is smaller than the preset threshold, taking the average of the real time vehicle speed for the road section's portion that the vehicle has traveled to be the estimated vehicle speed of the remaining portion of the road section; and in response to determining that the time is not smaller than the preset threshold, identifying a matched average standard vehicle speed that is associated to the road section, the matched average standard vehicle speed being identified from the relationship data of the historical meteorological data and the vehicle speed, and obtaining the estimated vehicle speed of the remaining portion of the road section according to the matched average standard vehicle speed that is associated to the road section;

acquiring logistics monitoring data according to the estimated vehicle speed, wherein acquiring the logistics monitoring data according to the estimated vehicle speed comprises determining whether the road section is congested according to a vehicle flow rate on the road section, the real time vehicle speed, and a corresponding average standard vehicle speed.

4. The method according to claim 3, wherein matching with the average standard vehicle speed that is associated to the road section from the relationship data of the historical meteorological data and the vehicle speed comprises one of the following:

seeking, from the relationship data between the historical meteorological data and vehicle speed, a vehicle speed for the same road section and same time segment with the same weather as the matched average standard vehicle speed that is associated to the road section;

seeking, from the relationship data between the historical meteorological data and vehicle speed, a vehicle speed for the same road section and another time segment with the same weather as the matched average standard vehicle speed that is associated to the road section; and seeking, from the relationship data between the historical meteorological data and vehicle speed, a vehicle speed for another road section as the matched average standard vehicle speed that is associated to the road section.

5. The method according to claim 3, wherein matching with the average standard vehicle speed that is associated to the road section from the relationship data of the historical meteorological data and the vehicle speed comprises:

seeking, from the relationship data between the historical meteorological data and vehicle speed, a vehicle speed for the same road section and same time segment with the same weather, and if there is such a vehicle speed, using the vehicle speed as the matched average standard vehicle speed that is associated to the road section;

in response to determining the vehicle speed for the same road section and same time segment with the same weather, using the vehicle speed as the matched average standard vehicle speed that is associated to the road section;

in response to determining no vehicle speed for the same road section and same time segment with the same weather, seeking, from the relationship data between the historical meteorological data and vehicle speed, a vehicle speed for the same road section and another time segment with the same weather, and;

in response to determining the vehicle speed for the same road section and another time segment with the same weather, using the vehicle speed as the matched average standard vehicle speed that is associated to the road section; and in response to determining no vehicle speed for the same road section and another time segment with the same weather, seeking, from the relationship data between the historical meteorological data and vehicle speed, a vehicle speed for another road section as the matched average standard vehicle speed that is associated to the road section.

6. The method according to claim 3, wherein after determining whether the road section is congested, further comprising:

acquiring a congestion duration time for the road section according to the vehicle flow rate on the road section and the estimated vehicle speed of the remaining portion.

7. The method according to claim 6, wherein after the congestion duration time for the road section is acquired, further comprising:

adjusting the route of the vehicle that passes through the road section when the congestion duration time is larger than the preset threshold.

8. The method according to claim 3, further comprising:

acquiring the estimated vehicle speeds of each subsequent road section of a route of the vehicle according to the estimated vehicle speed for the remaining portion of the vehicle on the road section; and wherein acquiring logistics monitoring data according to the estimated vehicle speed comprises:

estimating a travel time of the vehicle on each road section according to the remaining portion of the vehicle on the road section and the estimated vehicle speed for each road section; and estimating the time for the vehicle to reach one node according to the travel time of each road section prior to the node.

9. The method according to claim 8, wherein before estimating the time for the vehicle to reach one node according to the travel time of each road section prior to the node, further comprising:

establishing a correspondence relationship between the vehicle and a waybill.

10. The method according to claim 9, wherein the waybill comprises an already generated waybill and an estimated waybill obtained based on sale forecast.

11. The method according to claim 9, wherein estimating the time for the vehicle to reach the one node according to the travel time of each road section prior to the node comprises:

estimating the time for the vehicle to reach one node according to the travel time of each road section prior to a current node according to a waybill processing speed of a preceding node and travel time for each road section prior to the road section.

12. The method according to claim 11, wherein after the time for the vehicle to reach one node is estimated according to the travel time of each road section prior to the current node according to the waybill processing speed of the preceding node and the travel time for each road section prior to the road section, further comprising:

estimating a quantity of waybills to be processed for each time segment in future for the node based on the time for the vehicle to reach the node.

13. A non-transitory computer-readable storage medium storing instructions that, when executed by a processor of a logistics monitoring system, cause the system to perform a method, the method comprising:

obtaining an estimated vehicle speed of a vehicle on a road section according to meteorological and vehicle speed data of the road section, wherein the meteorological and vehicle speed data of the road section comprises real time meteorological data of the road section, real time vehicle speed of the vehicle, and relationship data between historical meteorological data and vehicle speed of the road section, wherein the relationship data between the historical meteorological data and the vehicle speed of the road section comprises an average standard vehicle speed of each vehicle type of a plurality of vehicle types based on the historical meteorological data according to the road section and a time segment, and wherein obtaining the estimated vehicle speed of the vehicle on the road section obtained based on the meteorological and the vehicle speed data of the road section comprises obtaining an average standard vehicle speed corresponding to a vehicle type of the vehicle based on the historical meteorological data of the road section and time segment, according to the meteorological data of the vehicle on the road section and the average standard vehicle speed of each vehicle type based on the historical meteorological data of the road section and time segment;

determining, after obtaining the average standard vehicle speed corresponding to the vehicle type of the vehicle, whether the time for the vehicle to travel on a remaining portion of the road section with an average of the real time vehicle speed for a portion of the road section that the vehicle has traveled is smaller than a preset threshold;

in response to determining that the time is smaller than the preset threshold, taking the average of the real time vehicle speed for the road section's portion that the vehicle has traveled to be the estimated vehicle speed of the remaining portion of the road section;

in response to determining that the time is not smaller than the preset threshold, identifying a matched average standard vehicle speed that is associated to the road section, the matched average standard vehicle speed being identified from the relationship data of the historical meteorological data and the vehicle speed, and obtaining the estimated vehicle speed of the remaining portion of the road section according to the matched average standard vehicle speed that is associated to the road section;

acquiring logistics monitoring data according to the estimated vehicle speed, wherein acquiring the logistics monitoring data according to the estimated vehicle speed comprises determining whether the road section is congested according to a vehicle flow rate on the road section, the real time vehicle speed, and a corresponding average standard vehicle speed.

* * * * *